(12) United States Patent
Kastiel

(10) Patent No.: US 11,926,443 B2
(45) Date of Patent: Mar. 12, 2024

(54) ROTORCRAFT

(71) Applicant: EFIX AVIATION LTD, Kadima (IL)

(72) Inventor: Efraim Kastiel, Tel Aviv (IL)

(73) Assignee: EFIX AVIATION LTD, Kadima (IL)

( * ) Notice: Subject to any disclaimer, the term of this patent is extended or adjusted under 35 U.S.C. 154(b) by 0 days.

(21) Appl. No.: 18/035,443

(22) PCT Filed: Nov. 29, 2021

(86) PCT No.: PCT/IL2021/051417
§ 371 (c)(1),
(2) Date: May 4, 2023

(87) PCT Pub. No.: WO2022/113086
PCT Pub. Date: Jun. 2, 2022

(65) Prior Publication Data
US 2023/0303271 A1    Sep. 28, 2023

(30) Foreign Application Priority Data

Nov. 30, 2020   (IL) .......................................... 279111
Jan. 17, 2021   (IL) .......................................... 280231

(51) Int. Cl.
*B64U 10/14*    (2023.01)
*B64C 27/22*    (2006.01)
(Continued)

(52) U.S. Cl.
CPC .............. *B64U 10/14* (2023.01); *B64C 27/22* (2013.01); *B64U 10/11* (2023.01); *B64U 30/29* (2023.01); *B64U 50/19* (2023.01); *G05D 1/102* (2013.01)

(58) Field of Classification Search
CPC ........ B64U 10/14; B64U 10/11; B64U 10/13; B64U 30/29; B64U 50/19; B64C 27/22; G05D 1/102
See application file for complete search history.

(56) References Cited

U.S. PATENT DOCUMENTS 10,046,853 B2    8/2018   Vander Mey
10,131,426 B2   11/2018   Judas et al.
(Continued)

FOREIGN PATENT DOCUMENTS

CN    110386248 A  * 10/2019   ............... B64C 1/30
EP      2990332 A1    3/2016
(Continued)

OTHER PUBLICATIONS

International Search Report Issued in PCT/IL2021/051417 dated Feb. 23, 2022.
(Continued)

*Primary Examiner* — Benjamin P Lee
(74) *Attorney, Agent, or Firm* — Panitch Schwarze Belisario & Nadel LLP

(57) ABSTRACT

Rotorcraft including a fuselage, at least three rotor system arms, a forward propulsion unit for providing forward propulsion to the rotorcraft and a flight control system. Each rotor system arm has a rotor system including a mast having at least two rotor blades and an electric rotor motor coupled to the mast for driving the mast whereupon the rotor blades act as a rotating rotor disc. Each rotor system has an individually controllable collective rotor blade pitch. At least one rotor system has a controllable cyclic rotor blade pitch. The flight control system controls the at least three electric rotor motors, the collective rotor blade pitch of each rotor system, the cyclic rotor blade pitch of the at least one rotor system and the forward propulsion unit in response to an input control indicating a desired maneuver to operate the rotorcraft for takeoff, flight and landing.

9 Claims, 25 Drawing Sheets

(51) Int. Cl.
*B64U 10/11* (2023.01)
*B64U 30/29* (2023.01)
*B64U 50/19* (2023.01)
*G05D 1/00* (2006.01)

(56) References Cited

U.S. PATENT DOCUMENTS

| | | | | |
|---|---|---|---|---|
| 10,322,796 | B2* | 6/2019 | Lee | B64C 15/12 |
| 10,829,200 | B2* | 11/2020 | Gonzalez | B64C 27/28 |
| 10,974,826 | B2* | 4/2021 | Karem | B64C 11/28 |
| 11,111,010 | B2 | 9/2021 | Bernard | |
| 11,148,799 | B2* | 10/2021 | Robertson | B64C 27/28 |
| 2016/0059958 | A1* | 3/2016 | Kvitnevskiy | B64C 27/08 244/17.23 |
| 2016/0137298 | A1* | 5/2016 | Youngblood | A63H 27/12 244/17.23 |
| 2016/0214710 | A1* | 7/2016 | Brody | B64C 29/0025 |
| 2016/0311528 | A1* | 10/2016 | Nemovi | B64C 27/82 |
| 2019/0135424 | A1* | 5/2019 | Baity | B64C 29/0033 |
| 2019/0351999 | A1 | 11/2019 | Stamps et al. | |
| 2020/0023829 | A1* | 1/2020 | Hefner | B64C 29/02 |
| 2022/0043465 | A1* | 2/2022 | Vander Mey | B64U 10/11 |
| 2022/0204157 | A1* | 6/2022 | Vander Mey | B64C 27/22 |

FOREIGN PATENT DOCUMENTS

| | | | |
|---|---|---|---|
| EP | 3725680 A1 | 10/2020 | |
| WO | WO-2022113087 A1 * | 6/2022 | |

OTHER PUBLICATIONS

International Preliminary Report on Patentability issued in PCT/IL2021/051417 dated Mar. 22, 2023.

* cited by examiner

ROTORCRAFT

CROSS-REFERENCE TO RELATED APPLICATIONS

This application is a Section 371 of International Application No PCT/IL2021/051417, filed Nov. 29, 2021, which was published in the English language on Jun. 2, 2022, under International Publication No. WO 2022/113086 A1, which claims priority under 35 U.S.C. § 119(b) to Israeli Application No. 279111, filed Nov. 30, 2020 and Israeli Application No. 280231, filed Jan. 17, 2021, the disclosures of each of which are incorporated herein by reference.

FIELD OF THE INVENTION

The invention relates to rotorcraft.

BACKGROUND OF THE INVENTION

Rotorcraft extend the gamut from helicopters with a single rotor system to multirotor rotorcraft having two or more rotor systems. Rotorcraft, like helicopters, may include Vertical Take-off and Landing (VTOL) rotorcraft and Short Take-Off and Landing (STOL) rotorcraft. Input control of a desired maneuver of a rotorcraft can be by way of a Remote Control (RC) unit, controls operated by an onboard pilot, an autopilot, and possibly a combination of two or more thereof. Rotor systems can include two so-called co-axial rotors.

Helicopters include a fuselage, a main rotor system and a tail rotor system. The main rotor system includes a main mast with at least two rotor blades, and a main motor coupled to the main mast via a freewheel mechanism for driving the main mast such that the main mast can freewheel autorotate without being driven by the main motor. Helicopters include a collective control for controlling collective pitch of the at least two rotor blades and a cyclic control for controlling cyclic pitch of the at least two rotor blades. Helicopters include a swashplate mechanism for controlling pitch of the at least two blades in response to the collective control and the cyclic control. Helicopters employ emergency autorotation to provide partial lift as a safe emergency landing method in the event of a main motor failure. In the case of an emergency landing, the freewheel mechanism affords a shallow descent rate to the helicopter, thereby extending its gliding range.

Gyrodynes are helicopters with rotor-like system for takeoff and landing and also includes one or more conventional propellers to provide forward thrust during cruising flight. U.S. Pat. No. 10,046,853 to Vander Mey describes a hybrid gyrodyne aircraft (hereinafter referred to as U.S. '853 gyrodyne) including a fuselage having a rotor arrangement with at least three rotor systems, at least one pusher and a flight control system for controlling the at least three rotor systems and the at least one pusher. The rotor systems include a motor for rotating a mast with a rotor blade pair. U.S. '853 gyrodyne includes a collective control for controlling collective pitch of the rotor blade pair. The collective control is alternatively named variable pitch control. The flight control system controls rotor rpm and/or collective pitch for steering purposes. The flight control system is configured to control the rotor systems that are configured to operate during forward flight in a power managed regime in which a net electrical power, consisting of the sum of the power being supplied to or drawn from each rotor by its motor, is maintained within a range determined by a feedback control system of the flight control system. U.S. '853 gyrodyne FIG. 1 shows a quadcopter with a pusher. U.S. '853 gyrodyne FIG. 3 shows a trirotor with a pusher. U.S. '853 gyrodyne FIG. 4 shows a quadcopter with a pusher and wings. U.S. '853 gyrodyne FIGS. 9A and 9B show a quadcopter with a pusher and rotor systems in a collapsed position and stowed for ground operation.

EP 2 990 332 A1 describes a VTOL rotorcraft (hereinafter referred to as EP '332 rotorcraft) including a central body having at least three rotor systems, and a flight control system. Each rotor system includes a mast having three rotor blades, a motor for driving the mast not through a freewheel mechanism, and a servo-controlled swashplate mechanism for enabling collective rotor blade control and cyclic rotor blade control. The flight control system controls the swashplate mechanisms for steering. The EP '332 rotorcraft is capable of an autorotation maneuver for safe emergency landing in the case of a power failure. EP '332 rotorcraft FIG. 12 shows a co-axial rotor system including a motor for revolving a lower mast having at least two rotor blades and a motor for revolving an upper mast having at least two rotor blades. The rotor systems are under independent control.

There is a need for rotorcraft having improved technical capabilities.

SUMMARY OF THE INVENTION

The present invention is directed to rotorcraft, components therefor, and a method of operation therefor. Rotorcraft of the present invention include a fuselage, at least three rotor system arms mounted on the fuselage each having a rotor system displaced from the fuselage, and a forward propulsion unit mounted on the fuselage for providing forward propulsion. The rotor systems each include a mast having two or more rotor blades and an electric rotor motor coupled to the mast for driving the mast whereupon the rotor blades act as a rotating rotor disc. Each rotor system of the at least three rotor systems has an individually controllable collective rotor blade pitch such that each rotor system can have an individual collective rotor blade pitch. At least one rotor system of the at least three rotor systems has an individually controllable cyclic rotor blade pitch. Preferably each rotor system of the at least three rotor systems has an individually controllable cyclic rotor blade pitch such that each rotor system can have an individual cyclic rotor blade pitch for improving steering and also enabling continuing flight in the case of a catastrophic loss of one of the rotor systems. Collective rotor blade pitches and cyclic rotor blade pitches can be controlled individually or simultaneously. The rotorcraft includes a flight control system for controlling the at least three electric rotor motors, the collective rotor blade pitch of each rotor system of the at least three rotor systems, the cyclic rotor blade pitch of the at least one rotor system of the at least three rotor systems, and the forward propulsion unit in response to an input control indicating a desired maneuver for operating the rotorcraft for take-off, flight and landing.

Rotorcraft of the present invention preferably include an even number of rotor systems as opposed to an odd number of rotor systems for facilitating steering as follows: Even number of rotor systems enable zero residual torque by virtue of at least two pairs of rotor systems where each pair of rotor system includes a clockwise rotating rotor system and a counter clockwise rotating rotor system. Odd number of rotor systems necessarily leave a residual torque due to an additional rotor system rotating clockwise or counterclockwise. In the case of a rotorcraft having an odd number of rotor systems, cyclic rotor blade pitch of one or more of its rotor systems can be employed for applying yaw to the rotorcraft to compensate for its additional rotor system rotating clockwise or counter-clockwise. Moreover, also in the case of a rotorcraft having all its rotor systems rotating in the same direction irrespective of whether it is an even or odd number of rotor systems, thereby necessarily resulting in a torque, cyclic rotor blade pitch of one or more its rotor systems operative can be employed for applying yaw to the rotorcraft to compensate for the torque.

Rotorcraft of the present invention extend the gamut from model rotorcraft to full sized passenger and/or payload carrying rotorcraft. Rotorcraft of the present invention can include an electrical forward propulsion unit or a combustion forward propulsion unit depending on technical parameters including inter glia size, weight, maximum payload, maximum range, maximum flight time, and the like. The forward propulsion unit can be implemented by a rear mounted pusher, two or more side mounted pushers, and a front mounted puller or a combination thereof. The forward propulsion unit can include vectored thrust means.

Rotorcraft of the present invention preferably include aerodynamic lifting surfaces, Rotor system arms can be configured as aerodynamic wings for providing lift. Alternatively, a rotorcraft's fuselage can be provisioned with aerodynamic wings for providing lift.

Rotorcraft of the present invention preferably include rotor systems having freewheel arrangements for enabling either an electric rotor motor to drive its associated mast or a mast to freewheel autorotate without being driven by its associated electric rotor motor. Freewheel arrangements can be implemented as mechanical freewheel mechanisms or non-mechanical arrangements. Freewheel autorotation is beneficial for emergency landings for extending a descent path. Freewheel autorotation is also beneficial for gyro-cruising on operation of a forward propulsion unit with completely unpowered or partially powered rotor systems.

Rotorcraft of the present invention synergistically combine three traditionally separate aerodynamic concepts of helicopter, autogyros and fixed wing aircraft for providing VTOL/STOL, hovering, autogyro flight efficiency and fixed wing range, speed and payload capacity. The flight envelope of the rotorcraft of the present invention has positively overlapping flight phases as follows: taking off like VTOL/STOL rotorcraft, accelerating and ascending like an autogyro, high-speed gyro-cruising for straight and level flight like an autogyro and/or fixed wing aircraft, decelerating and descending like an autogyro, and landing like VTOL/STOL rotorcraft. Exemplary rotorcraft speed ranges for takeoff/landing are between about 0 knots and about 30 knots, accelerating and ascending/decelerating and descending between about 15 knots and about 80 knots, and high-speed gyro-cruising from about 60 knots to about 100 knots. Positively overlapping flight phases means that transitioning from one flight phase to another doesn't pose a risk to the rotorcraft regardless of speed and altitude potential, eliminating a helicopter's deadman's curve and guaranteeing safe flight operation at all flight phases even in case of power loss.

BRIEF DESCRIPTION OF DRAWINGS

In order to understand the present invention and to see how it can be carried out in practice, preferred embodiments will now be described, by way of non-limiting examples only, with reference to the accompanying drawings, in which similar parts are likewise numbered, and in which.

DETAILED DESCRIPTION OF DRAWINGS

Figure 1A:
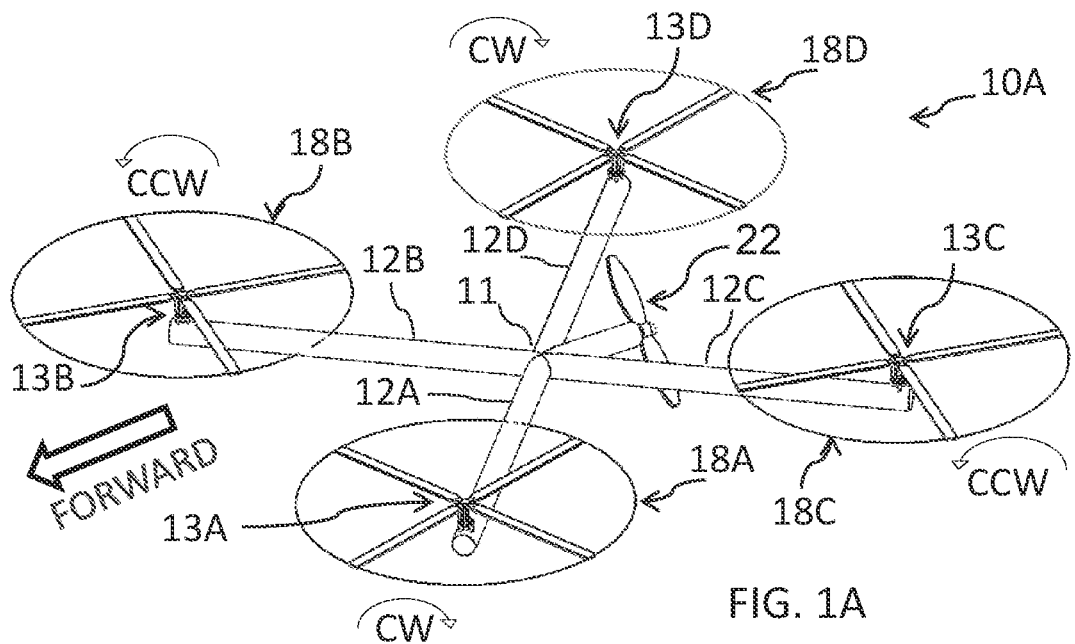
FIG. 1A is a pictorial view of a quadcopter with collective control of its four rotor systems and cyclic control of a single rotor system.
Figure 1B:
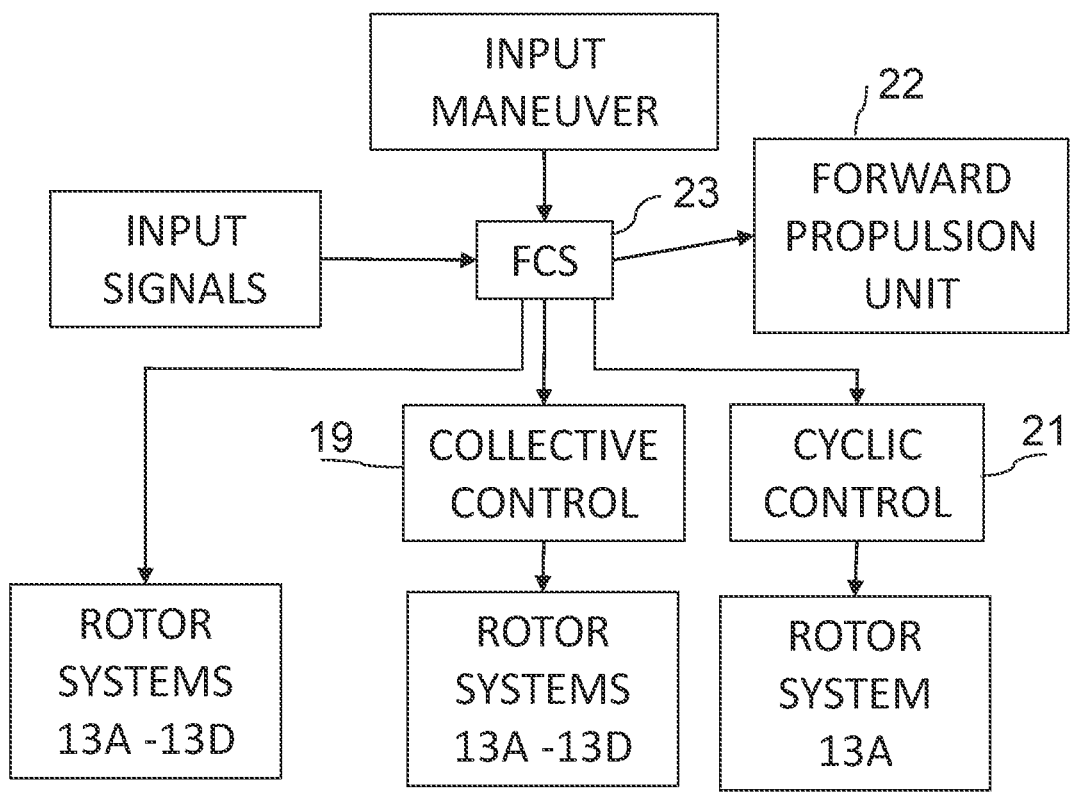
FIG. 1B is a block diagram of a flight control system of the FIG. 1A quadcopter.

The detailed description of the drawings is divided into the following three sections
Section 1: Description of Present Invention Rotorcraft
Section 2: Steering of Present Invention Rotorcraft
Section 3: Technical Benefits of Present Invention. Rotorcraft Section 1: Description of Present Invention Rotorcraft Rotorcraft 10 of the present invention include a fuselage 11 and at least three rotor system arms 12 extending therefrom. FIG. 1A and FIG. 1B show a rotorcraft 10A including a fuselage 11 and four rotor system arms 12A, 12B, 12C and 12D extending from the fuselage 11 and each having a rotor system 13 displaced from the fuselage 11. The fuselage 11 is constituted by an intersection of the four rotor system arms 12A, 12B, 12C and 12D. The rotor system arms 12A, 12B, 12C and 12D correspondingly include rotor systems 13A, 13B, 13C and 13D. The rotor systems 13A and 13D rotate clockwise relative to forward direction and rotor systems 13B and 13C rotate counterclockwise relative to forward direction. Each rotor system 13 includes a mast 14 having at least two rotor blades 16 and an electric rotor motor 17 coupled to the mast 14 for driving the mast 14 as shown in greater detail in FIG. 3A to FIG. 3C. The rotor systems 13A-13D on rotation act as rotor discs 18A-18D.

The rotorcraft 10A is enabled with conventional collective control 19 of the collective rotor blade pitches of the four rotor systems 13A-13D and conventional cyclic control 21 of the cyclic rotor blade pitch of the rotor system 13A only. Each rotor system 13A-13D can have an individual collective rotor blade pitch. The rotor system 13A includes a servo-controlled swashplate mechanism for enabling individual or simultaneous adjustment of collective rotor blade pitch and cyclic rotor blade pitch. The rotor system 13A can include alternative mechanisms for enabling individual or simultaneous adjustment of collective rotor blade pitch and cyclic rotor blade pitch. The rotor systems 13B, 13C and 13D each include a variable pitch mechanism for adjusting their individual collective rotor blade pitch.

The rotorcraft 10A includes a forward propulsion unit 22 constituted by a rear mounted pusher for providing forward propulsion.

The rotorcraft 10A includes a real-time Flight Control System (FCS) 23 for controlling the electric rotor motors 17A-17D, the collective rotor blade pitch of the rotor systems 13A-13D, the cyclic rotor blade pitch of the rotor system 13A and the forward propulsion unit 22 in response to an input control indicating a desired maneuver and a multitude of input signals regarding the attitude of the rotorcraft 10A, flight conditions, and the like. The FCS 23 is a computing device including at least one processing unit and memory. The presently disclosed subject matter, or certain aspects or portions thereof, may take the form of program code embodied in computer readable storage medium for loading into a computing device whereupon the computing device becomes the FCS 23.

The rotor systems 13A-13D preferably each include a freewheel arrangement for enabling either an electric rotor motor to drive its associated mast or a mast to freewheel autorotate without being driven by its associated electric rotor motor. The freewheel arrangements assist emergency autorotation for safe landing and auto-cruising on operation of the forward propulsion unit 22.

The rotorcraft 10A has a predetermined total take-off payload weight and an optimal flight speed for cruising flight at a non-descending altitude. The rotorcraft 10A at a predetermined total take-off payload weight has an overall drag at its optimal flight speed. The rotorcraft 10A with the forward propulsion unit 22 assistance, is capable of straight and level gyro-cruising flight when the electric rotor motors 17A-17D of the rotor systems 13A-13D are powered upto 25% of their maximum power. The rotorcraft 10A can be provided with a more powerful forward propulsion unit 22 such that the rotorcraft 10A is capable of straight and level gyro-cruising flight when the electric rotor motors 17A-17D of the rotor systems 13A-13D are not powered.

Figure 2A:
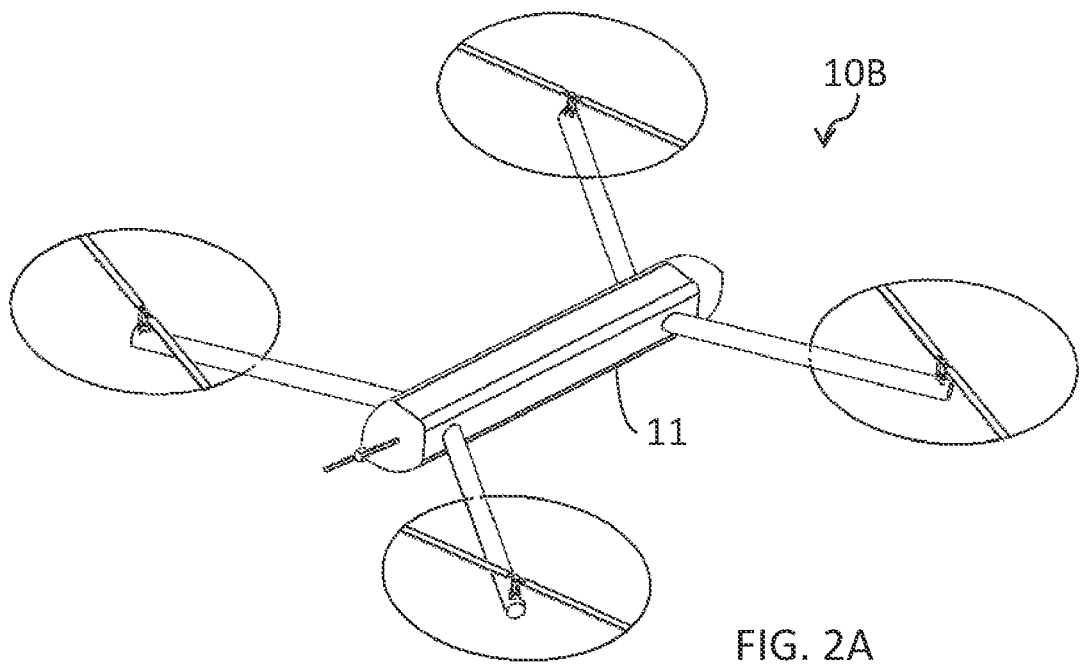
FIG. 2A is a pictorial view of a quadcopter with collective control of its four rotor systems and cyclic control of its four rotor systems.
Figure 2B:
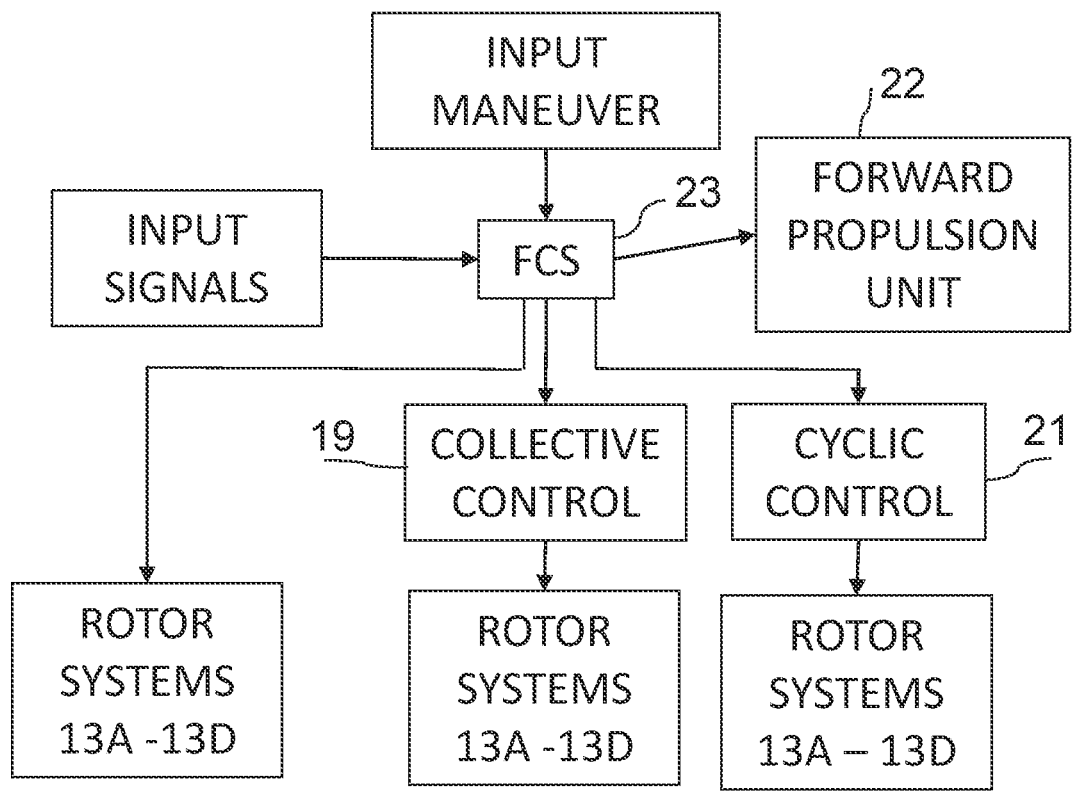
FIG. 2B is a block diagram of a flight control system of the FIG. 2A quadcopter.

FIG. 2A and FIG. 2B show a quadcopter 10B including a fuselage 11 designed for passengers and/or payload. Accordingly, fuselages 11 can have different shapes and sizes. The quadcopter 10B differs from the quadcopter 10A insofar as each rotor system 17A-17D has an individually controllable cyclic rotor blade pitch. The four rotor systems 13A-13D preferably each having a servo-controlled swashplate mechanism for enabling individual or simultaneous adjustment of their collective rotor blade pitch and cyclic rotor blade pitch.

Figure 3A:
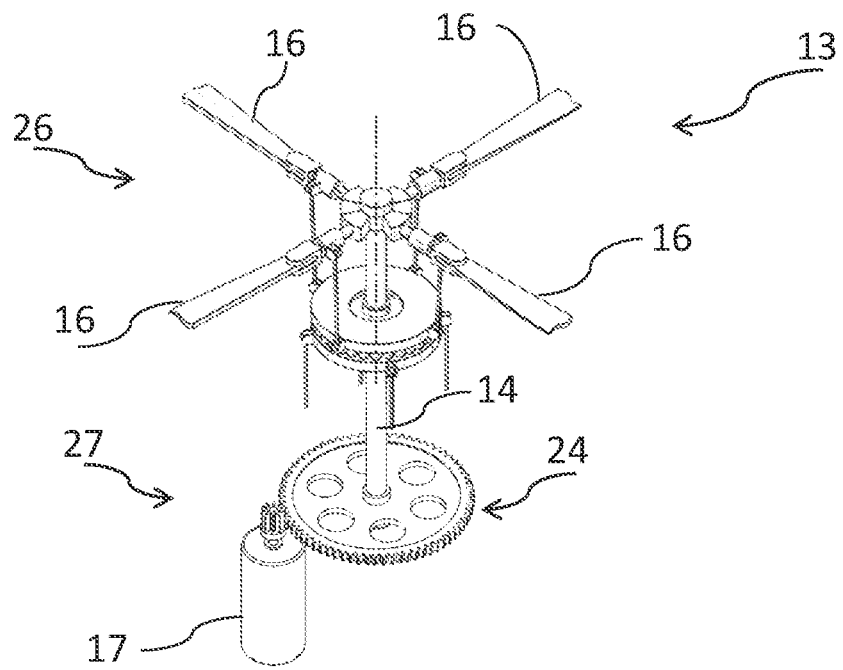
FIG. 3A is a close-up view of one implementation of a rotor system.

FIG. 3A shows a rotor system 13 includes a mast 14 having four rotor blades 16 and an electric rotor motor 17 coupled to the mast 14 through a gear transmission 24 for driving the mast 14. The rotor system 13 includes a swashplate mechanism 26 for enabling individual or simultaneous adjustment of collective rotor blade pitch and cyclic rotor blade pitch of the four rotor blades 16. The rotor system 13 includes a freewheel mechanism 27 either in the electric rotor motor 17 or in the gear transmission 24 between the mast 14 and the electric rotor motor 17.

Figure 3B:
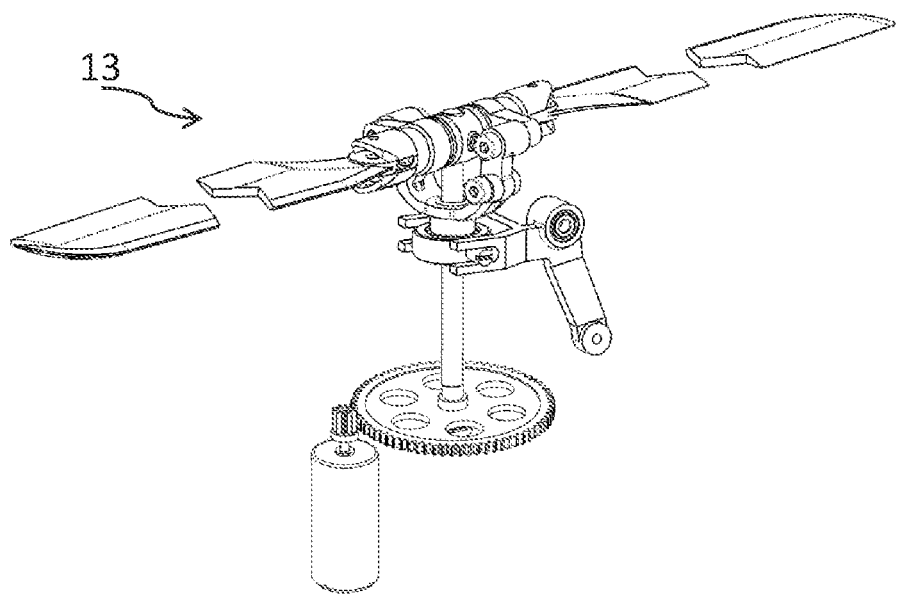
FIG. 3B is a close-up view of another implementation of a rotor system.
Figure 3C:
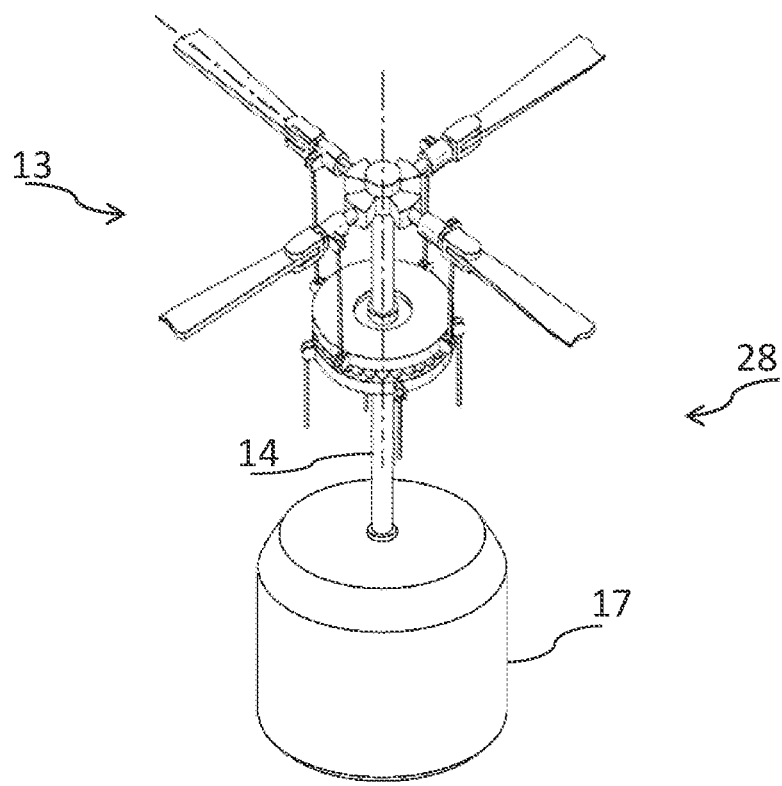
FIG. 3C is a close-up view of yet another implementation of a rotor system.

FIG. 3B shows a rotor system 13 differing from the FIG. 3A rotor system insofar it enables adjustment of collective rotor blade pitch only and does not include a swashplate mechanism, FIG. 3C shows a rotor system 13 including an electric rotor motor 17 directly coupled to a mast 14 for driving the mast 14. The rotor system 13 can have an electrical freewheel arrangement 28.

Figure 4:
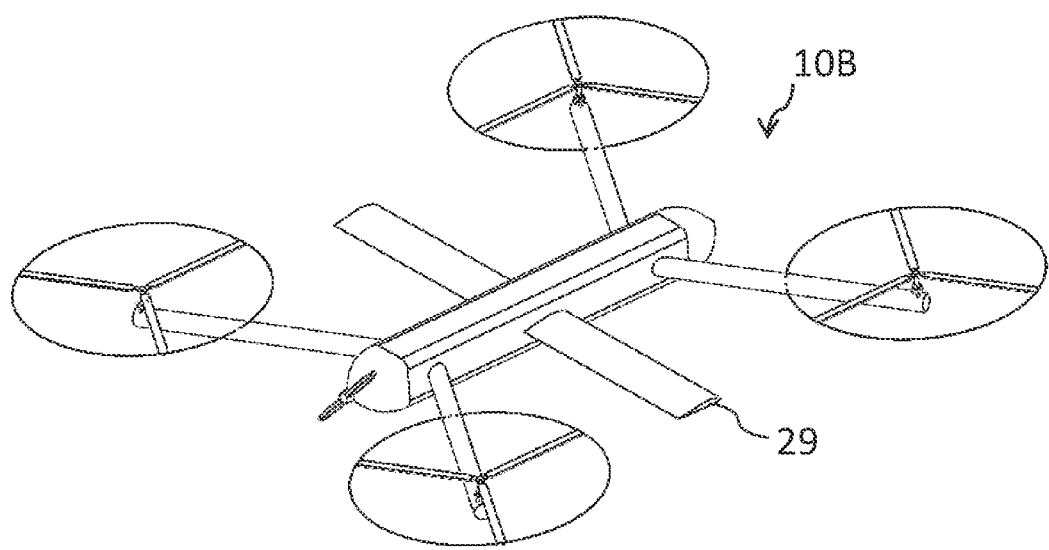
FIG. 4 is a pictorial view of a quadcopter with wings.

FIG. 4 shows the quadcopter 10B with a pair of aerodynamic wings 29.

Figure 5A:
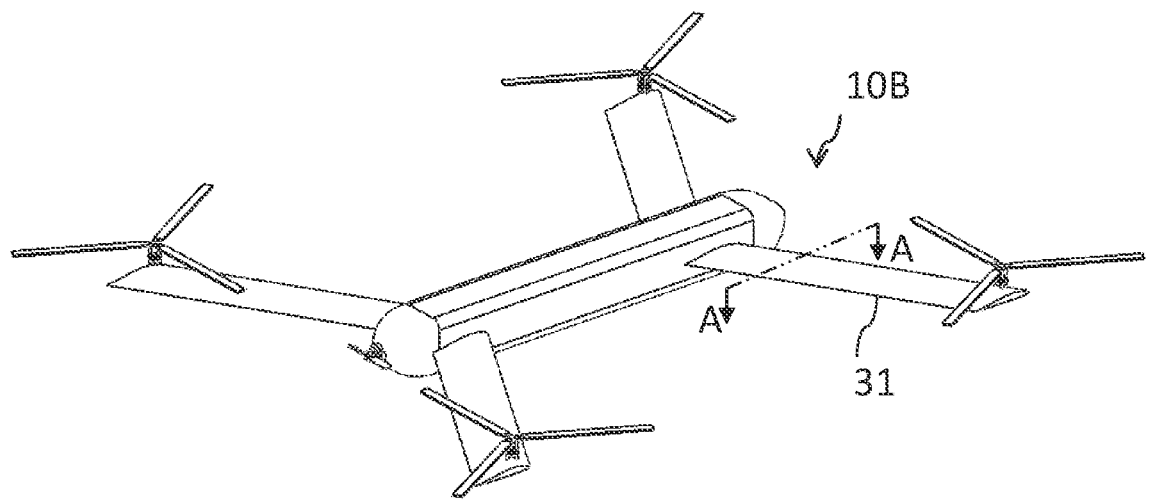
FIG. 5A is a pictorial view of a quadcopter with rotor system arms configured as aerodynamic wings for providing lift.
Figure 5B:
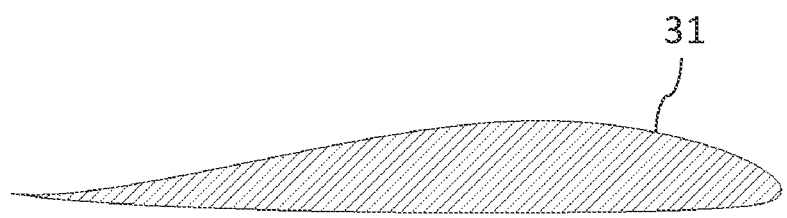
FIG. 5B is a transverse cross section of an aerodynamic lifting rotor system arm along line A-A in FIG. 5A.

FIG. 5A and FIG. 5B show the quadcopter 10B with rotor system arms 31 configured aerodynamic wings for providing lift.

Figure 6:
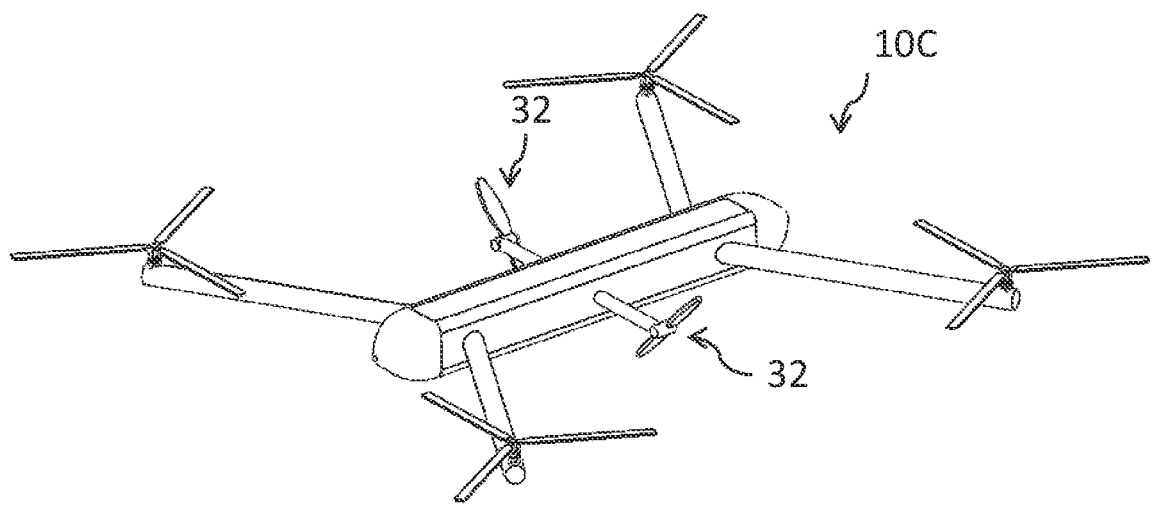
FIG. 6 is a pictorial view of a quadcopter with twin forward propulsion units.

FIG. 6 shows a quadcopter 10C similar to the quadcopter 10B and differing therefrom insofar as the latter 10C includes a forward propulsion unit 22 implemented by a lateral pair of forward propulsion propellers 32.

Figure 7:
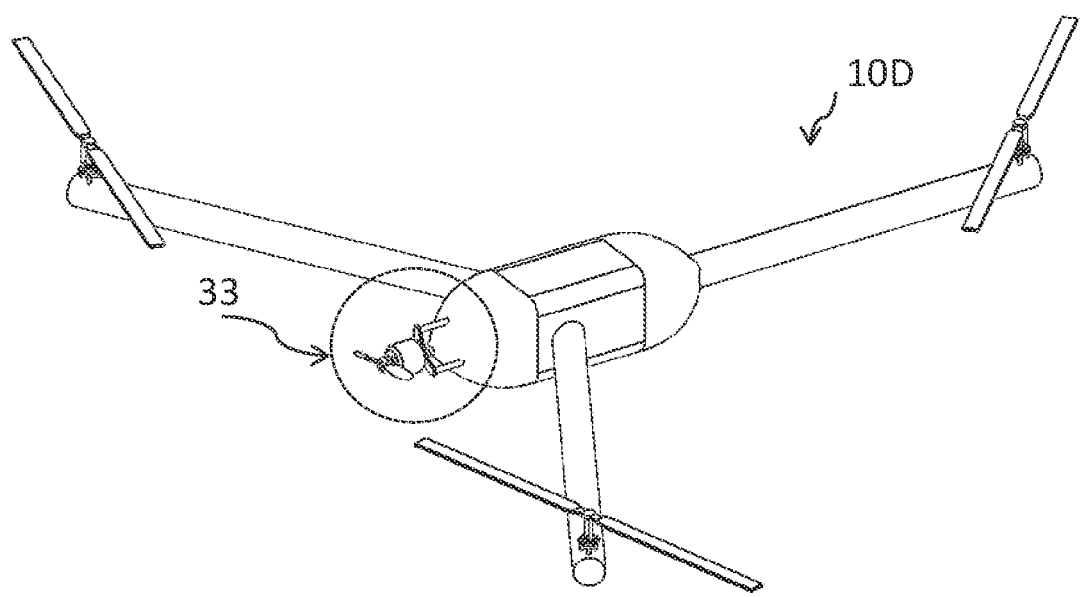
FIG. 7 is a pictorial view of a tricopter with a vectored thrust.

FIG. 7 shows a tricopter 10D similar in construction and operation as the quadcopter 10B except that the former includes three rotor system arms and a vectored thrust propeller 33. Two rotor systems rotate clockwise relative to forward direction and the third rotor system rotates counterclockwise relative to forward direction, thereby rendering a residual clockwise torque which tends to rotate the tricopter 10D in a counterclockwise direction relative to forward direction. Such residual clockwise torque can be countered by at least one of the rotor systems operable by its cyclic control being set for yaw.

Figure 8A:
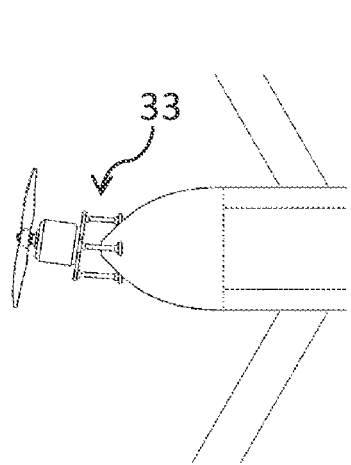
FIG. 8A is a pictorial view of the vectored thrust for right thrust.
Figure 8B:
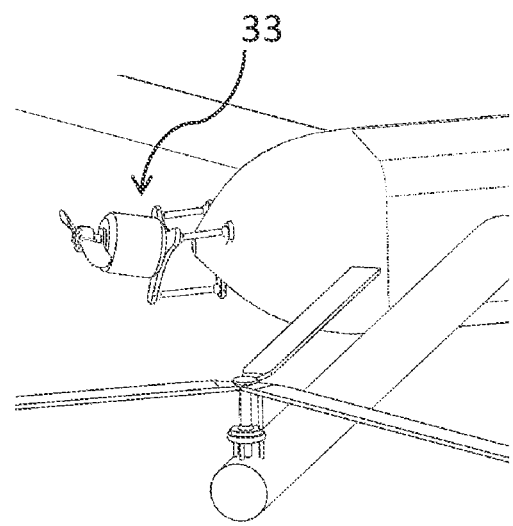
FIG. 8B is a pictorial view of vectored thrust for down thrust.

FIG. 8A and FIG. 8B show the vectored thrust propeller 33 for providing thrust in two exemplary directions: FIG. 8A shows right thrust and FIG. 8B shows down thrust.

Section 2: Steering of Present Invention Rotorcraft

The below table lists the preferred rotorcraft steering for pitch, roll and yaw maneuvers in order of appearance.

| Maneuver | Hovering | Cruising |
| --- | --- | --- |
| Right/left Roll | Collective only or, Cyclic only or, Combined collective & cyclic | Cyclic only or, Collective only or Combined collective & cyclic |
| Up/down Pitch | Collective only or, Cyclic only or Combined collective & cyclic | Cyclic only or, Collective only or Combined collective & cyclic |

-continued

| Maneuver | Hovering | Cruising |
| --- | --- | --- |
| CW/CCW Yaw | Cyclic only or, Collective only or Combined collective & cyclic | Cyclic only or, Collective only or Combined collective & cyclic |

FIG. 9 to FIG. 17 show steering a quadcopter 10 by individually adjusting the collective rotor blade pitch of its four rotor systems 13A-13D and adjusting the cyclic rotor blade pitch of the rotor system 13A only.

FIG. 18 to FIG. 26 show steering a quadcopter 10 by individually adjusting the collective rotor blade pitch of its four rotor systems 13A-13D and individually adjusting the cyclic rotor blade pitch of the rotor systems 13A-13D.

Figure 9A:
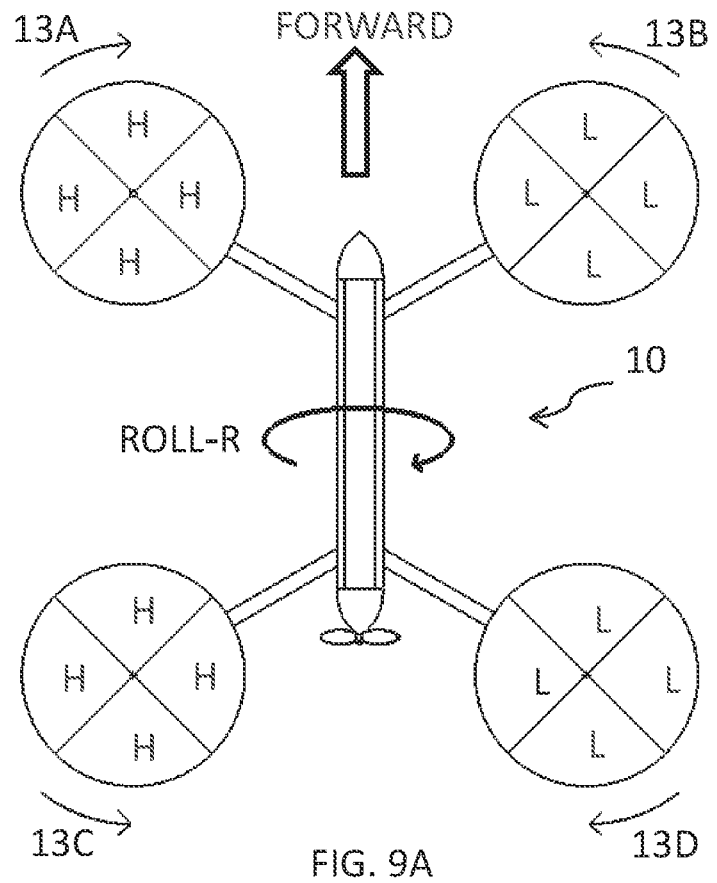
FIG. 9A is a schematic top view of the FIG. 1A quadcopter showing use of collective control for right roll.
Figure 9B:
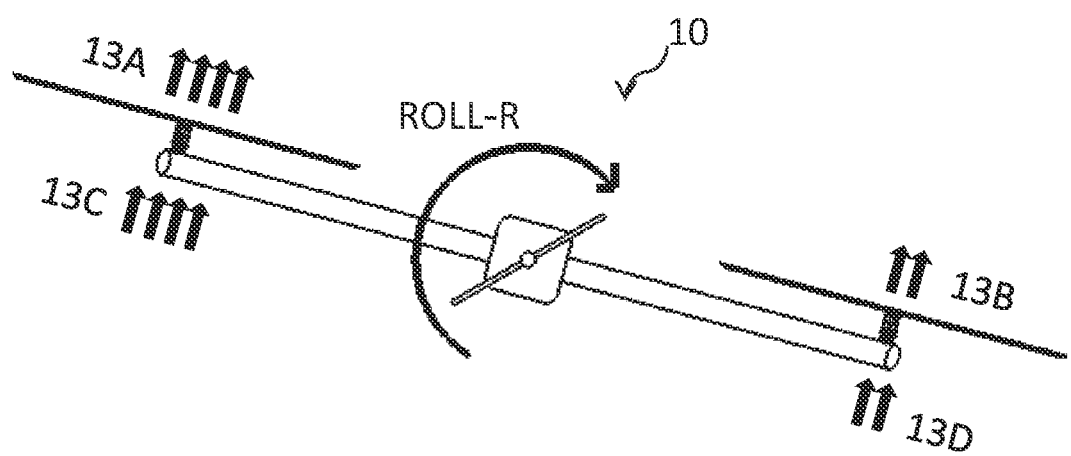
FIG. 9B is a schematic trailing end view of the FIG. 1A quadcopter showing use of collective control for right roll.
Figure 10A:
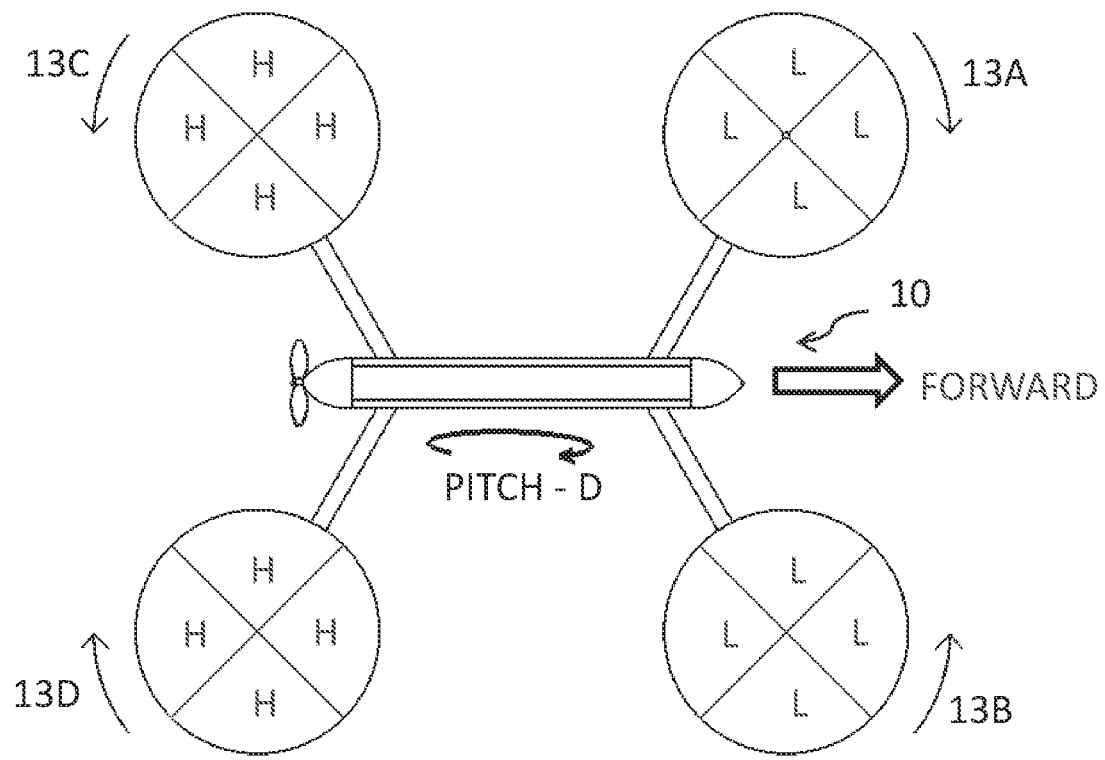
FIG. 10A is a schematic top view of the FIG. 1A quadcopter showing use of collective control for pitch down.
Figure 10B:
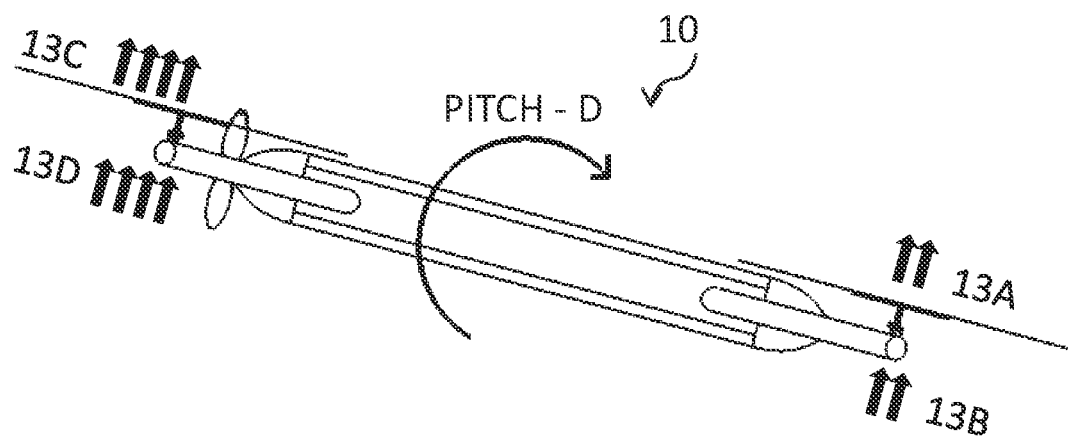
FIG. 10B is a schematic right elevation view of the FIG. 1A quadcopter showing use of collective control for pitch down.
Figure 11A:
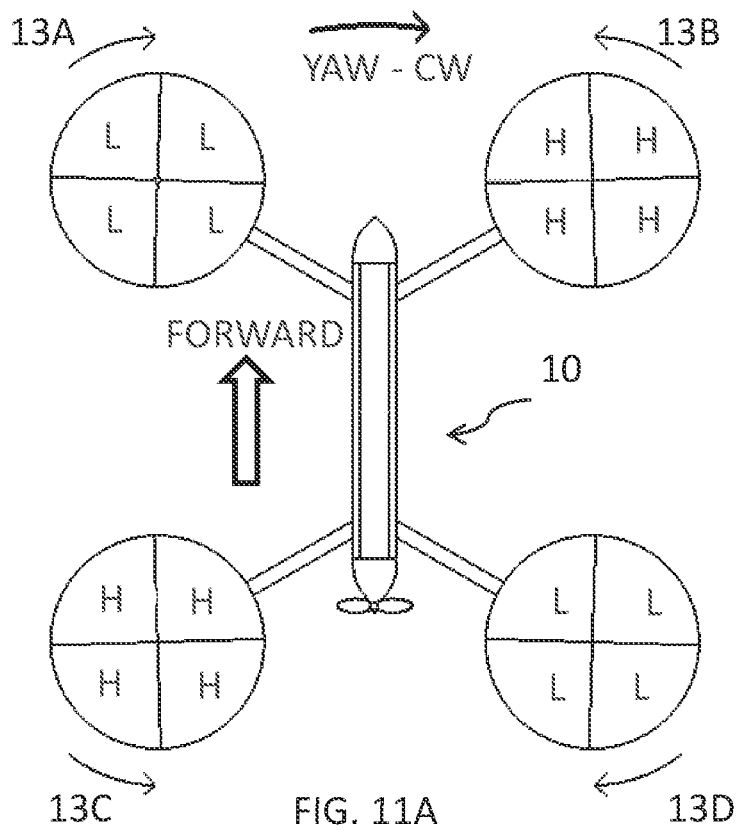
FIG. 11A is a schematic top view of the FIG. 1A quadcopter showing use of collective control for clockwise yaw.
Figure 25A:
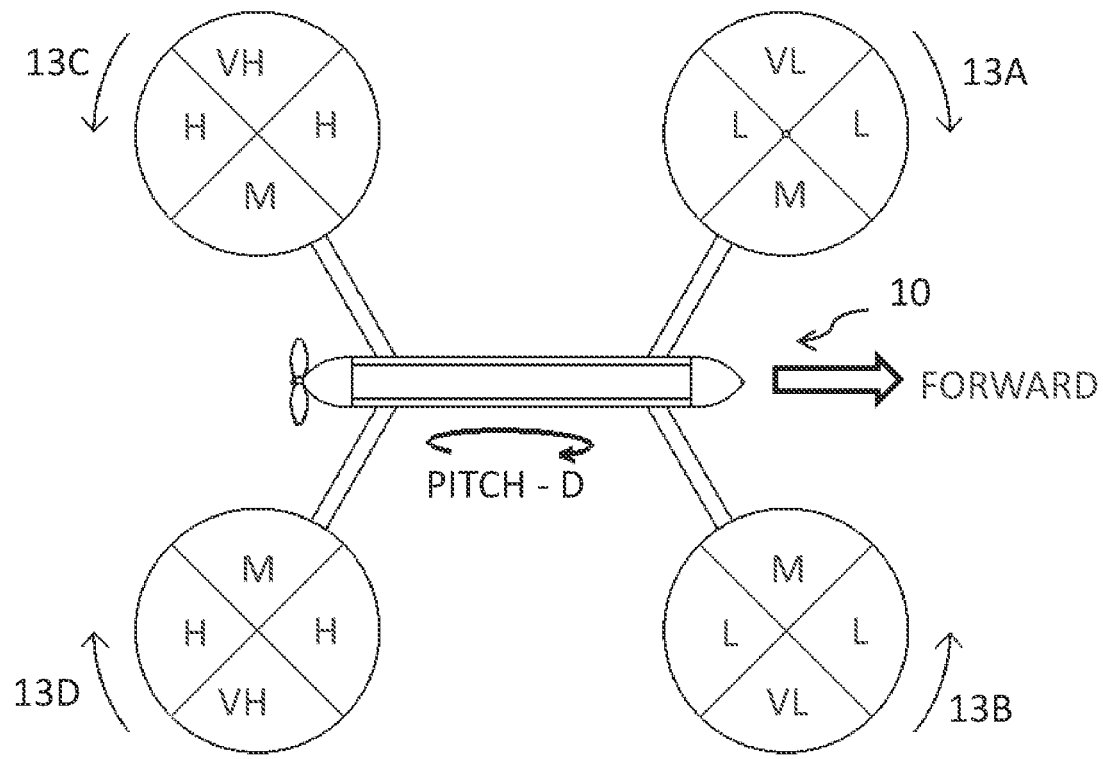
FIG. 25A is a schematic top view of the FIG. 2A quadcopter showing combined use of collective control and cyclic control for pitch down.
Figure 25B:
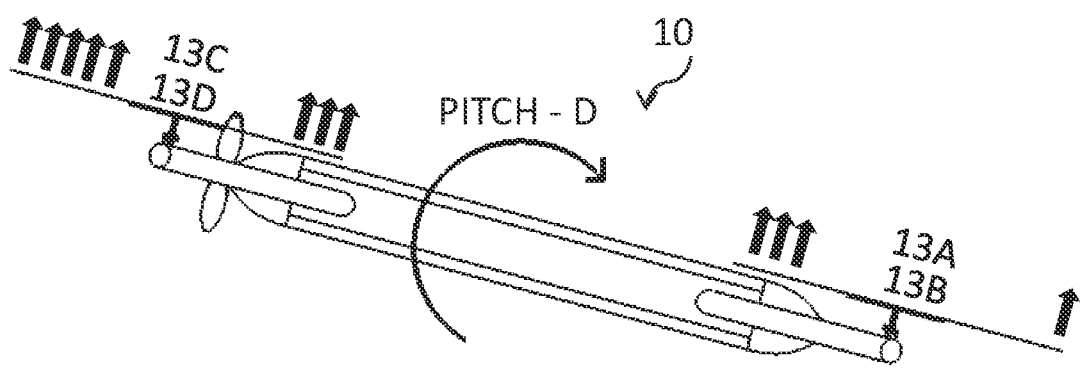
FIG. 25B is a schematic right elevation view of the FIG. 2A quadcopter showing combined use of collective control and cyclic control for pitch down.
Figure 26A:
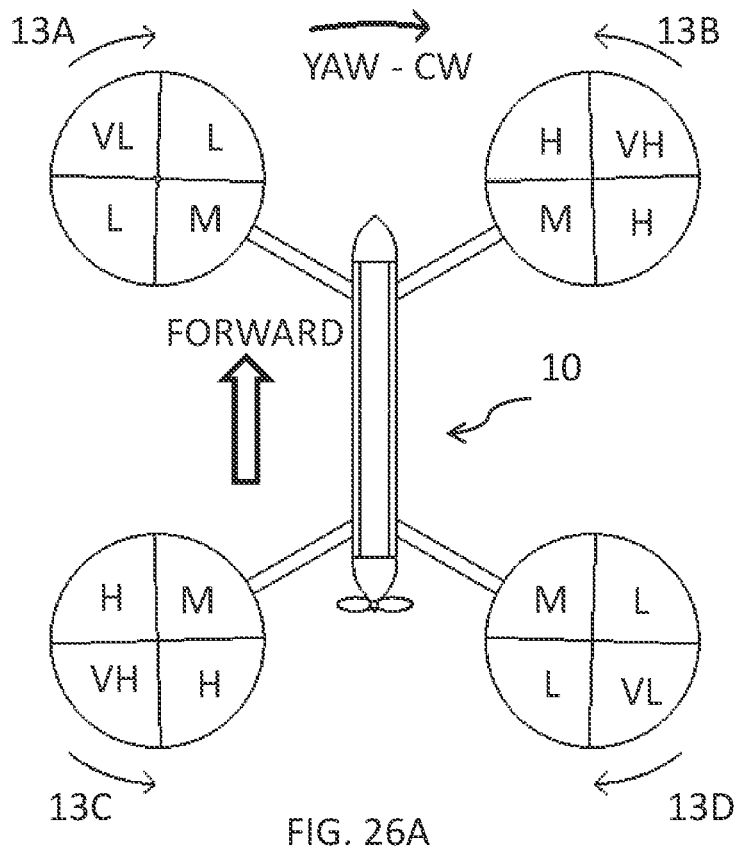
FIG. 26A is a schematic top view of the FIG. 2A quadcopter showing combined use of collective control and cyclic control for clockwise yaw.
Figure 26B:
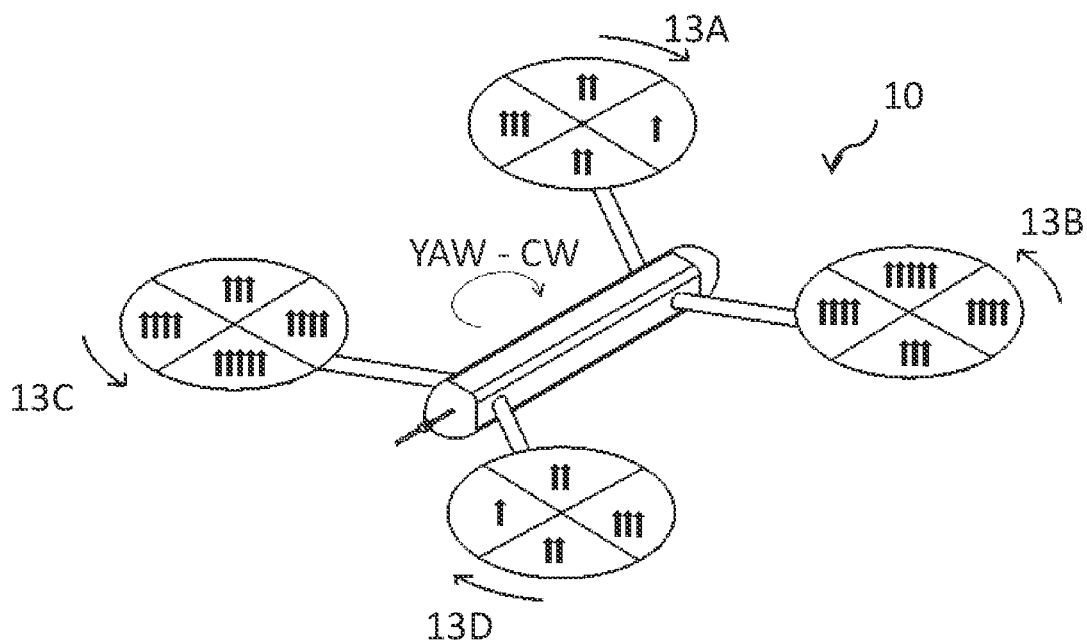
FIG. 26B is a schematic perspective view of the FIG. 2A quadcopter showing combined use of collective control and cyclic control for clockwise yaw.

FIG. 9A, FIG. 10A, FIG. 11A, . . . , FIG. 25A and FIG. 26A show rotor blade pitches graded as follows:
VL represents very low rotor blade pitch
L represents low rotor blade pitch
M represents medium rotor blade pitch
H represents high rotor blade pitch
VH represents very high rotor blade pitch FIG. 9B, FIG. 10B, FIG. 11B, . . . , FIG. 25B and FIG. 26B show a lift force on a rotor disc as denoted by upward arrows. More arrows indicate more lift force.

Figure 11B:
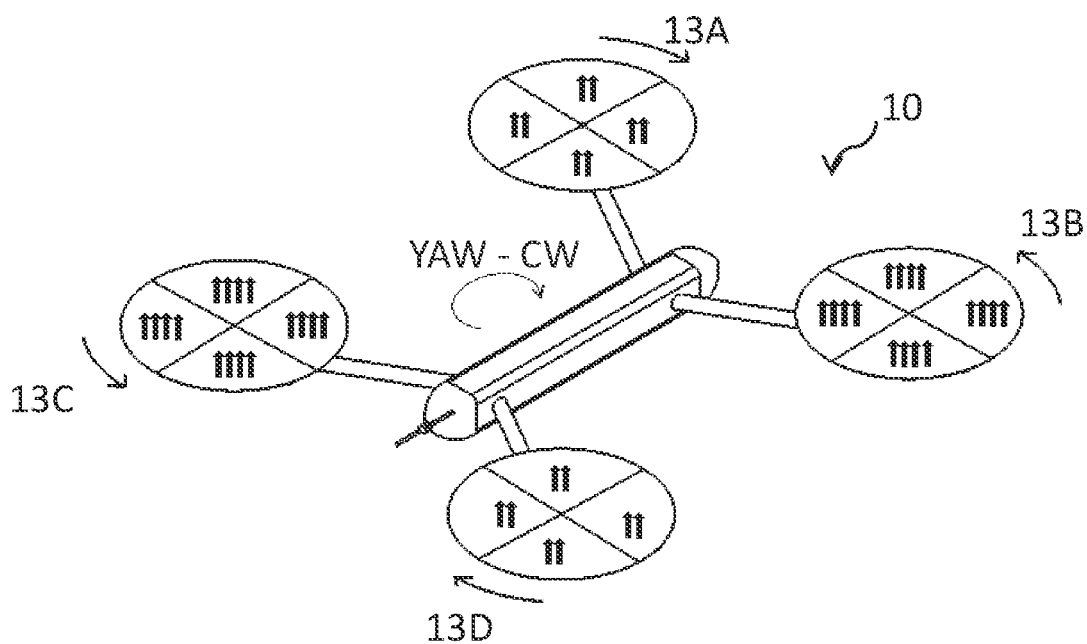
FIG. 11B is a schematic perspective view of the FIG. 1A quadcopter showing use of collective control for clockwise yaw.

FIG. 9 to FIG. 11 show use of collective rotor blade pitch only for right roll, pitch down and clockwise yaw, respectively. FIG. 9A, FIG. 10A and FIG. 11A show an input control to the collective rotor blade pitch. FIG. 9A, FIG. 10A and FIG. 11A show two rotor blade pitches: high and low. FIG. 9B, FIG. 10B and FIG. 11B show the effect of the input control on the lift forces on the rotor systems 13A, 13B, 13C and 13D.

FIG. 9B shows the rotor system 13A and the rotor system 13C provide the same lift, the rotor system 13B and the rotor system 13D provide the same lift, and the former provide greater lift than latter for right roll. FIG. 10B shows the rotor system 13A and the rotor system 13B provide the same lift, the rotor system 13C and the rotor system 13D provide the same lift, and the latter provide greater lift than the former for pitch down. FIG. 11B shows the rotor system 13A and the rotor system 13D provide the same lift, the rotor system 13B and the rotor system 13C provide the same lift, and the latter provide greater lift than the former for clockwise yaw.

Figure 12A:
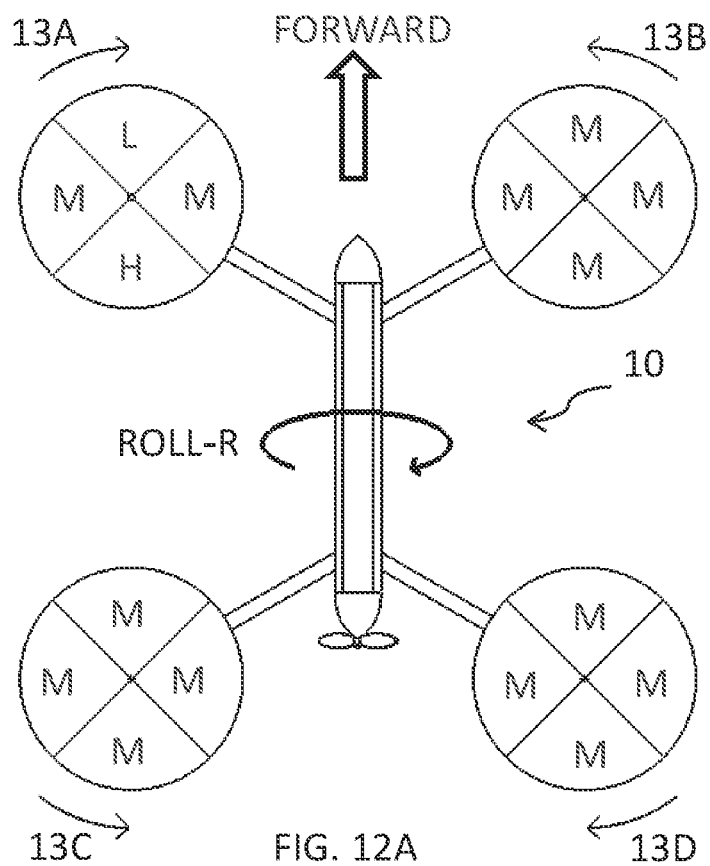
FIG. 12A is a schematic top view of the FIG. 1A quadcopter showing use of cyclic control for right roll.
Figure 12B:
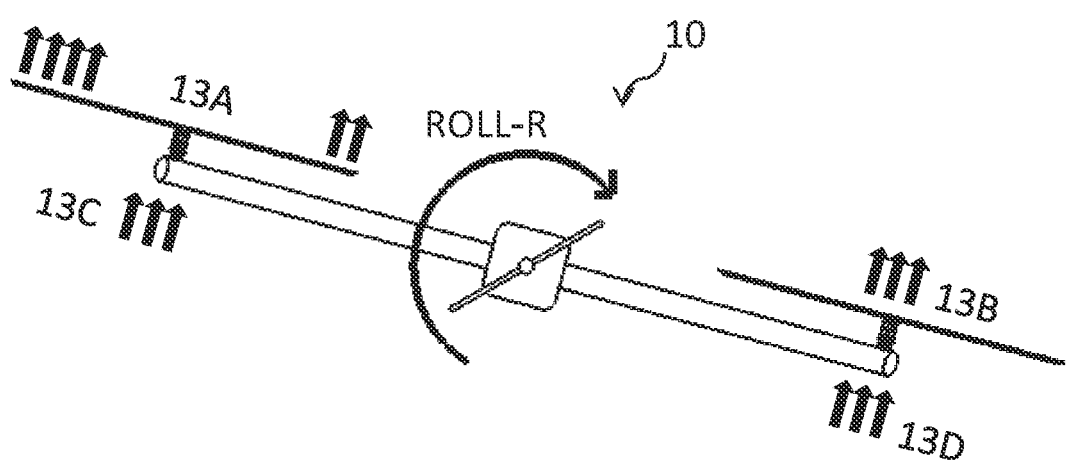
FIG. 12B is a schematic trailing end view of the FIG. 1A quadcopter showing use of cyclic control for right roll.
Figure 13A:
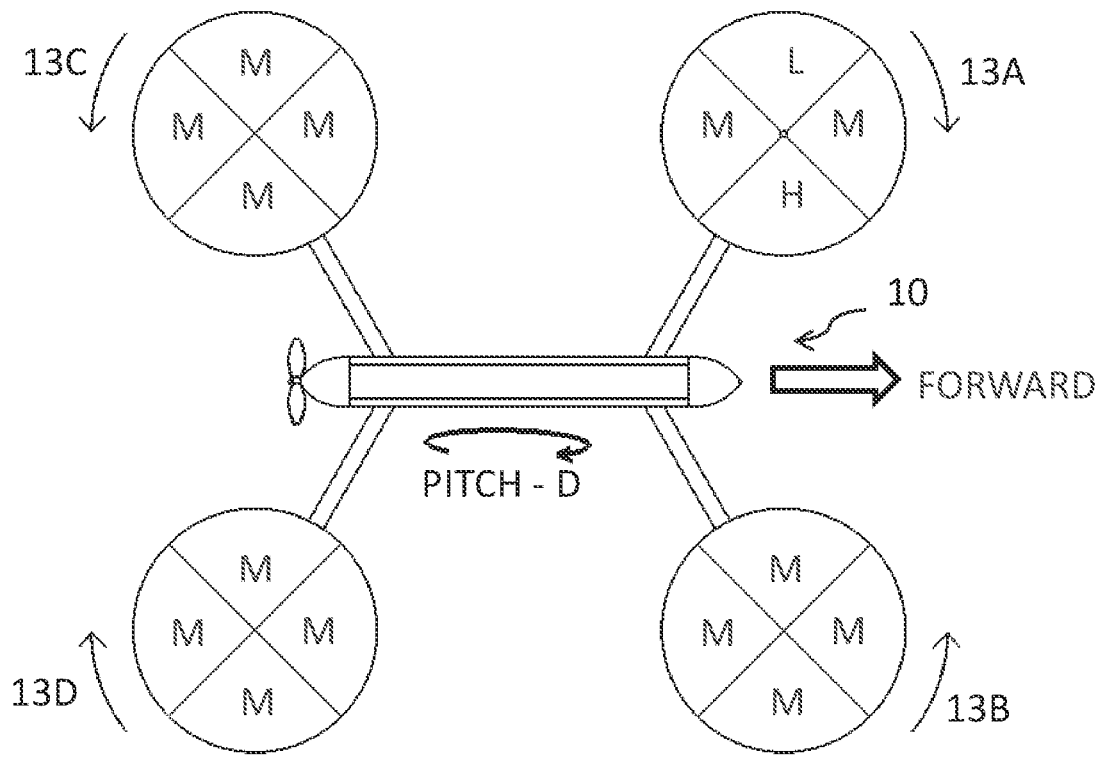
FIG. 13A is a schematic top view of the FIG. 1A quadcopter showing use of cyclic control for pitch down.
Figure 13B:
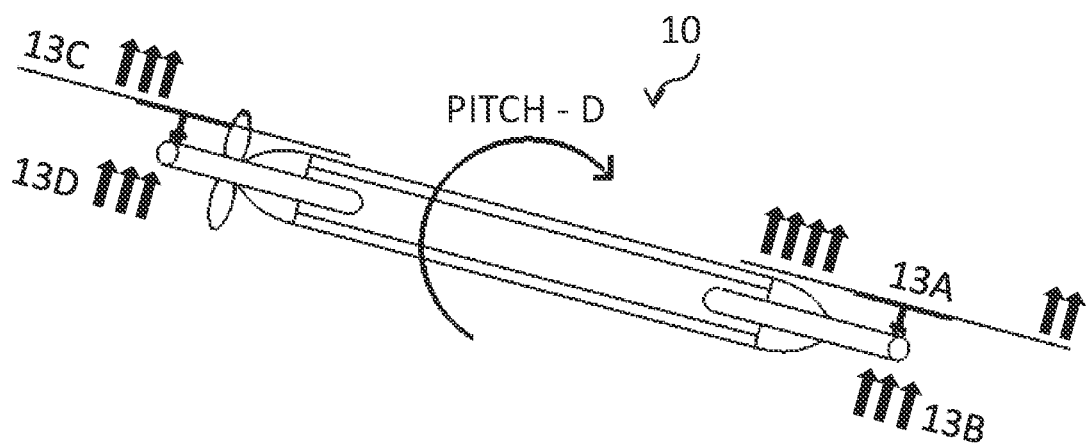
FIG. 13B is a schematic right elevation view of the FIG. 1A quadcopter showing use of cyclic control for pitch down.
Figure 14A:
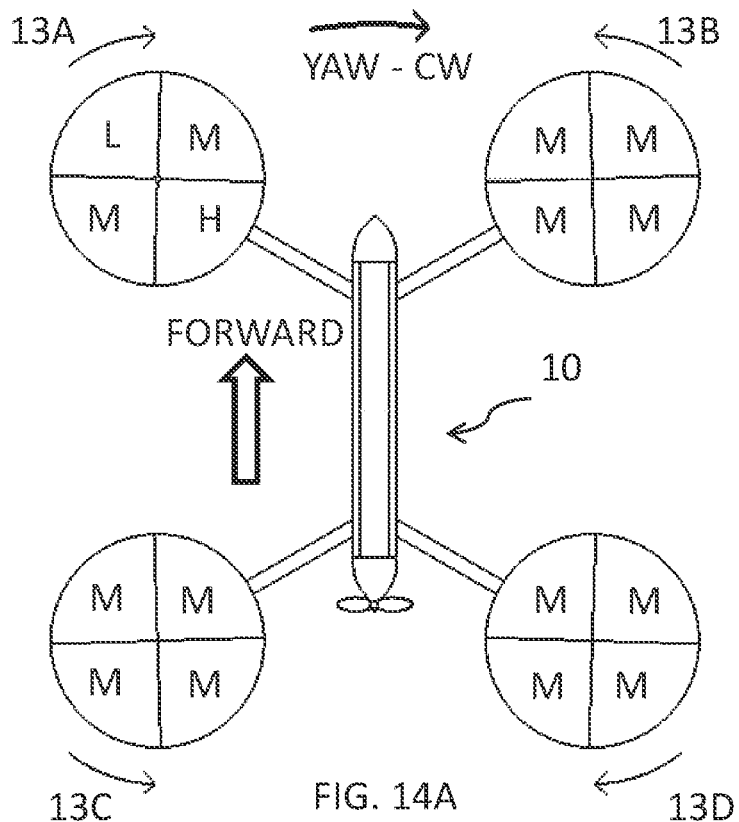
FIG. 14A is a schematic top view of the FIG. 1A quadcopter showing use of cyclic control for clockwise yaw.
Figure 14B:
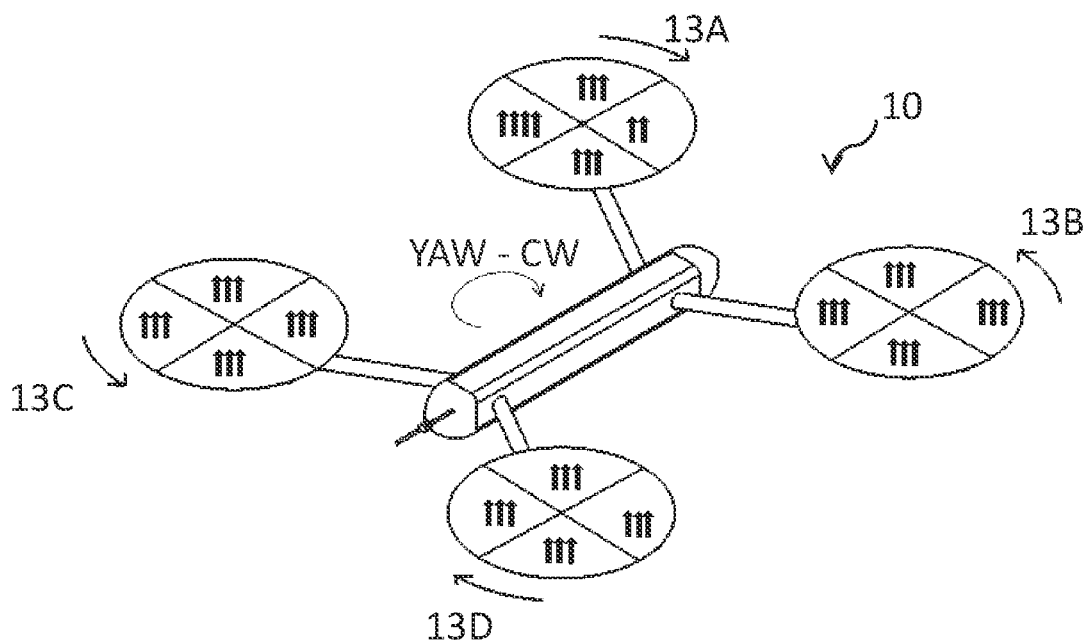
FIG. 14B is a schematic perspective view of the FIG. 1A quadcopter showing use of cyclic control for clockwise yaw.

FIG. 12 to FIG. 14 show use of cyclic rotor blade pitch only for right roll, pitch down, and clockwise yaw, respectively. FIG. 12A, FIG. 13A and FIG. 14A show an input control to the cyclic rotor blade pitch. FIG. 12A, FIG. 13A and FIG. 14A show three rotor blade pitches: high, medium and low. FIG. 12B, FIG. 13B and FIG. 14B show the effect of the input control on the lift force on the rotor system 13A taking into account the phase lag from the input control. FIG. 12B, FIG. 13B and FIG. 14B show the rotor system 13A provides a different lift than the rotor system 13B, the rotor system 13C and the rotor system 13D which provide the same lift.

Figure 15A:
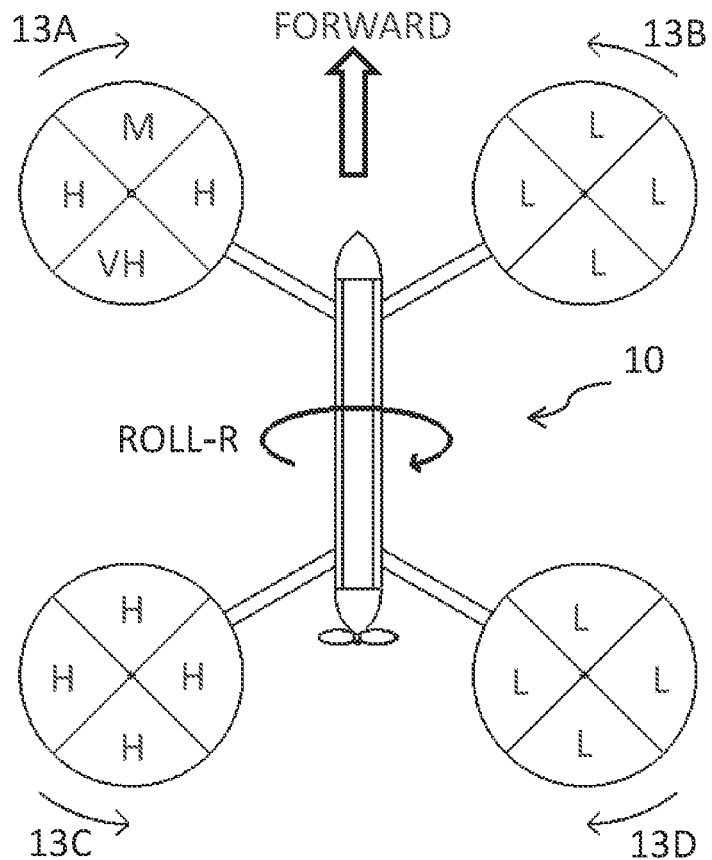
FIG. 15A is a schematic top view of the FIG. 1A quadcopter showing combined use of collective control and cyclic control for right roll.
Figure 15B:
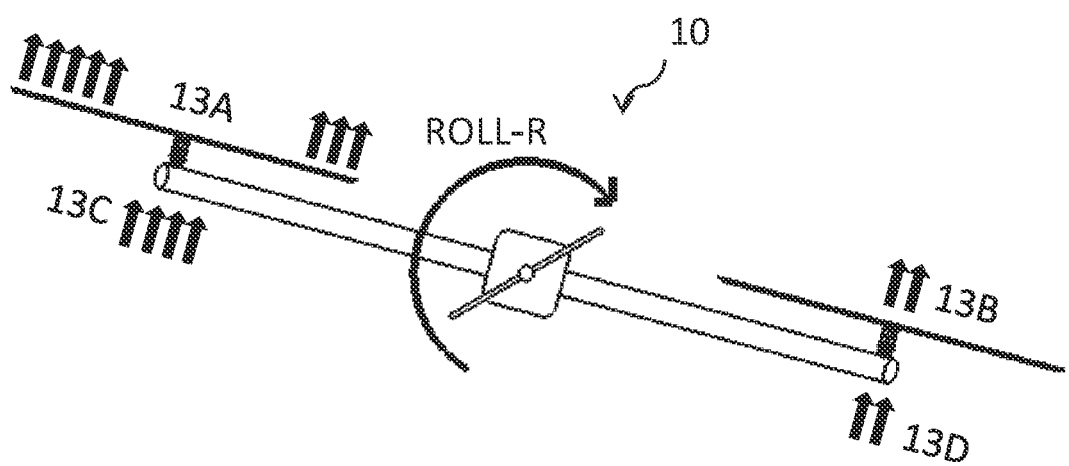
FIG. 15B is a schematic trailing end view of the FIG. 1A quadcopter showing combined use of collective control and cyclic control for right roll.
Figure 16A:
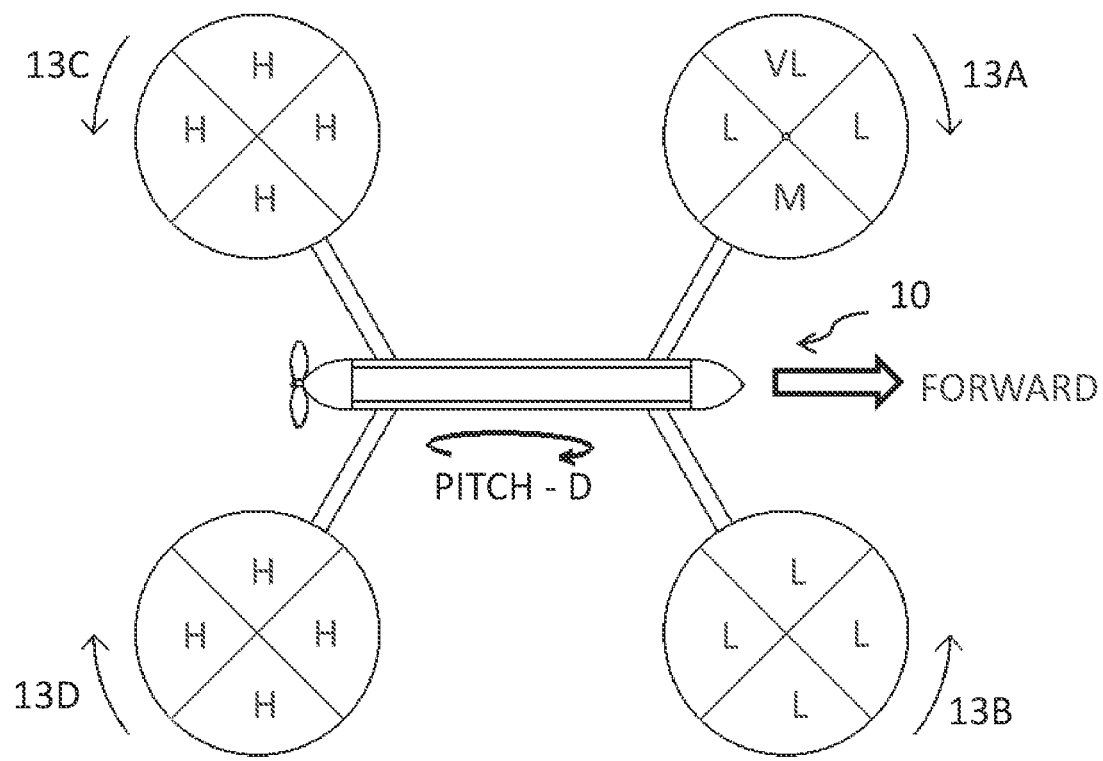
FIG. 16A is a schematic top view of the FIG. 1A quadcopter showing combined use of collective control and cyclic control for pitch down.
Figure 16B:
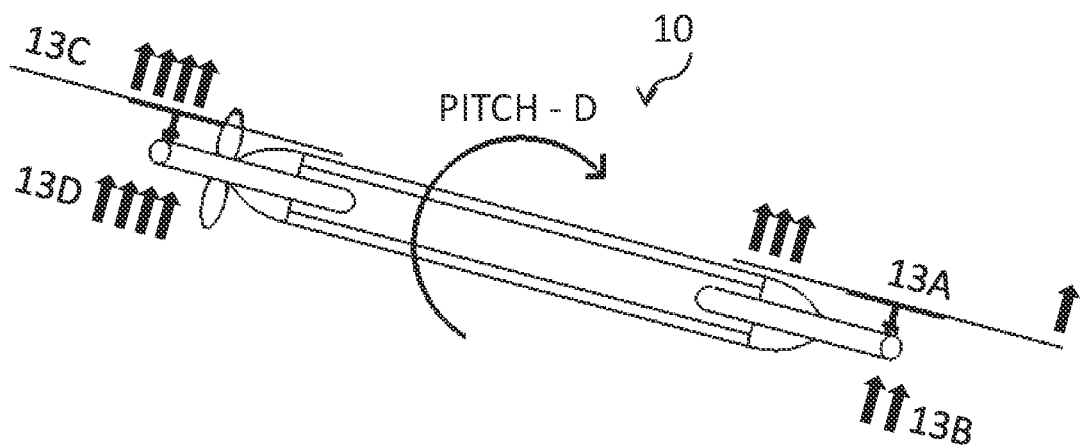
FIG. 16B is a schematic right elevation view of the FIG. 1A quadcopter showing combined use of collective control and cyclic control for pitch down.
Figure 17A:
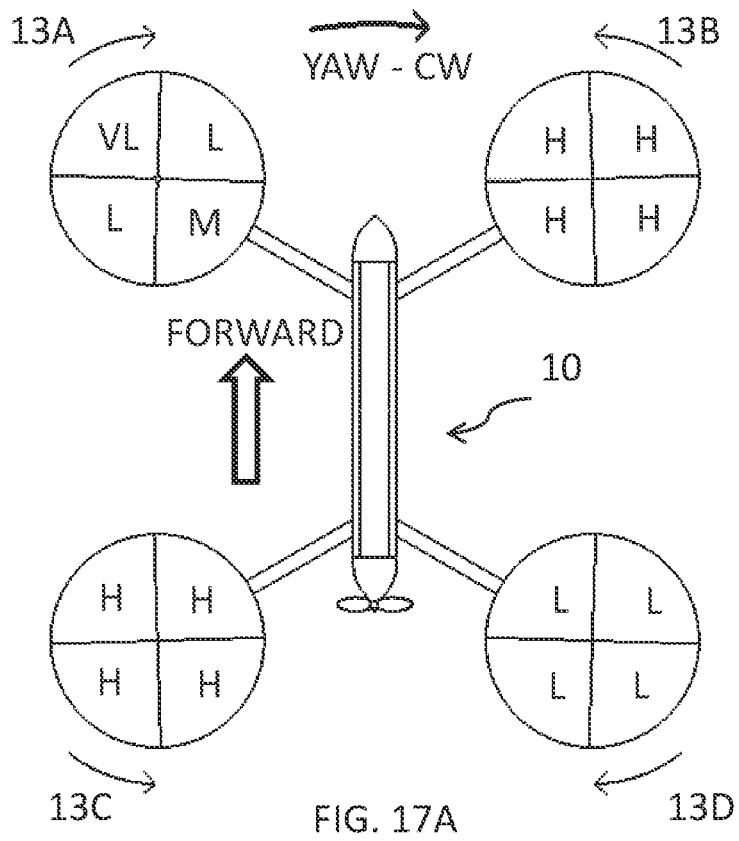
FIG. 17A is a schematic top view of the FIG. 1A quadcopter showing combined use of collective blade control and cyclic control for clockwise yaw.
Figure 17B:
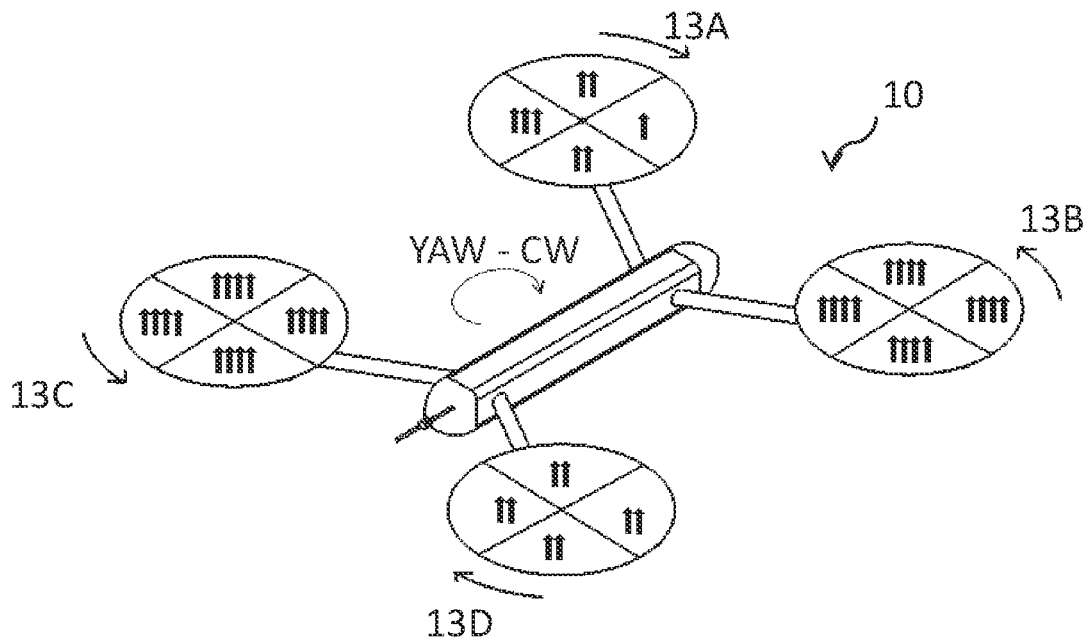
FIG. 17B is a schematic perspective view of the FIG. 1A quadcopter showing combined use of collective control and cyclic control for clockwise yaw.

FIG. 15 to FIG. 17 show combined use of collective rotor blade pitch and cyclic rotor blade pitch for right roll, pitch down, and clockwise yaw, respectively. FIG. 15A, FIG. 16A and FIG. 17A show an input control to the collective rotor blade pitch and the cyclic rotor blade pitch. FIG. 15A, FIG. 16A and FIG. 17A show five rotor blade pitches from high to low. FIG. 15B, FIG. 16B and FIG. 17B show the effect of the input control on the lift forces on the rotor disc 13A taking into account the phase lag from the input control.

FIG. 15B, FIG. 16B and FIG. 17B show the rotor system 13A provides a different lift than the rotor system 13B, the rotor system 13C and the rotor system 13D which provide the same lift.

Figure 18A:
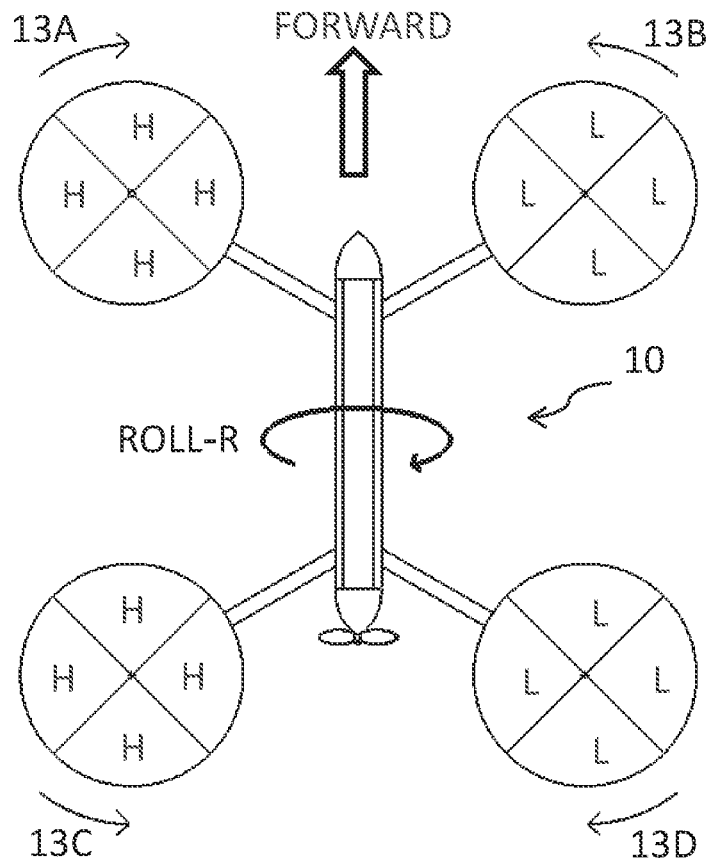
FIG. 18A is a schematic top view of the FIG. 2A quadcopter showing use of collective control for right roll.
Figure 18B:
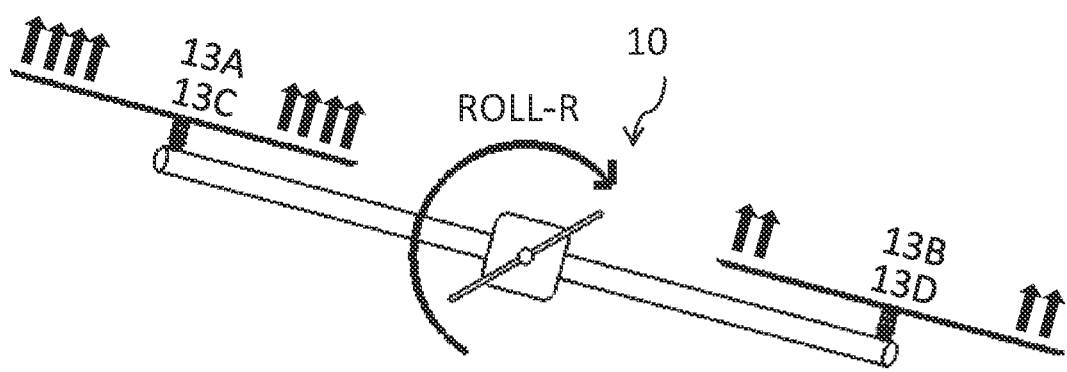
FIG. 18B is a schematic trailing end view of the FIG. 2A quadcopter showing use of collective control for right roll.
Figure 19A:
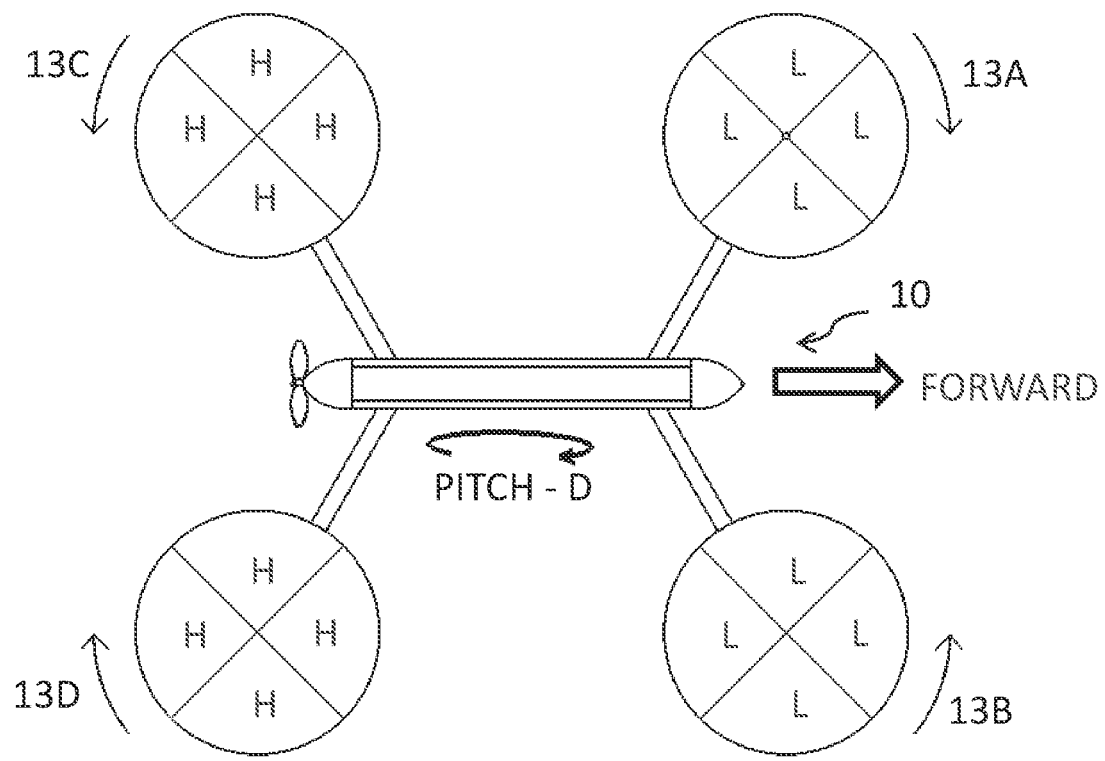
FIG. 19A is a schematic top view of the FIG. 2A quadcopter showing use of collective control for pitch down.
Figure 19B:
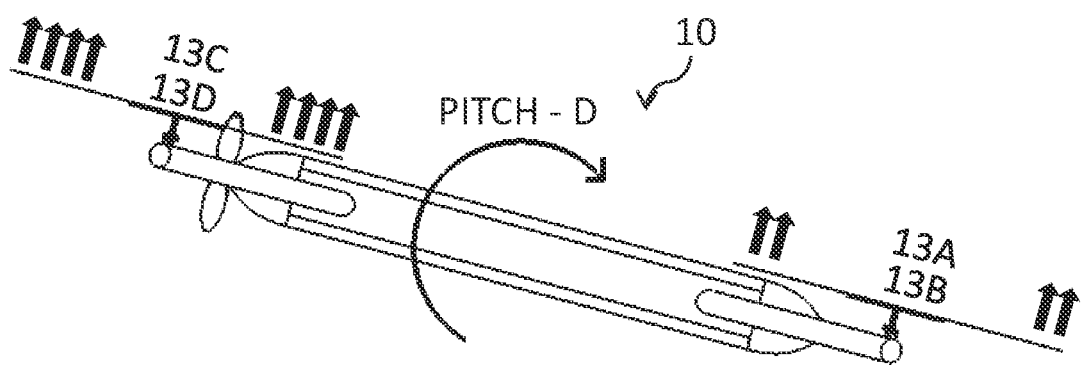
FIG. 19B is a schematic right elevation view of the FIG. 2A quadcopter showing use of collective control for pitch down.
Figure 20A:
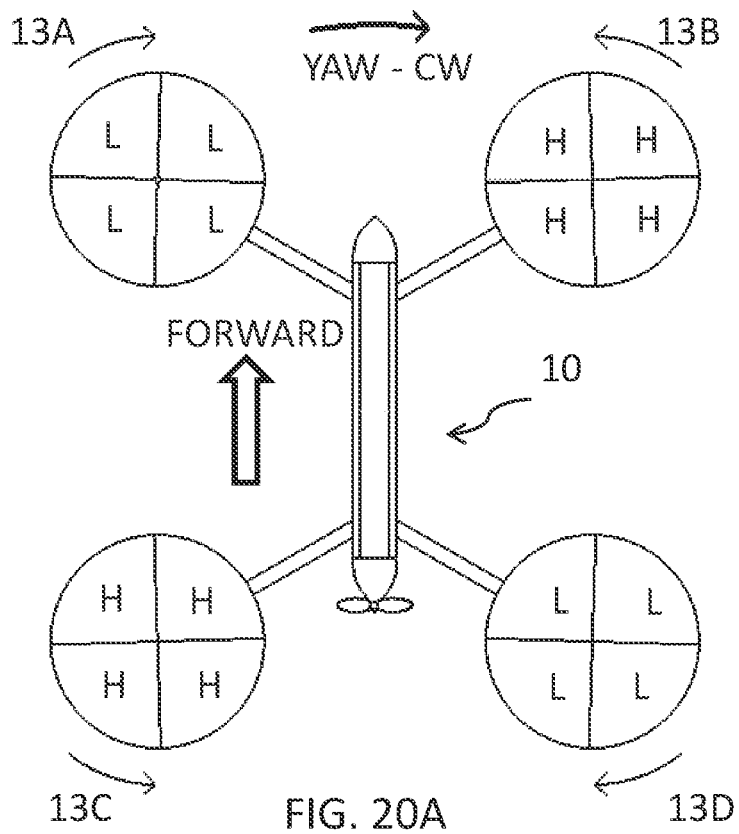
FIG. 20A is a schematic top view of the FIG. 2A quadcopter showing use of collective control for clockwise yaw.
Figure 20B:
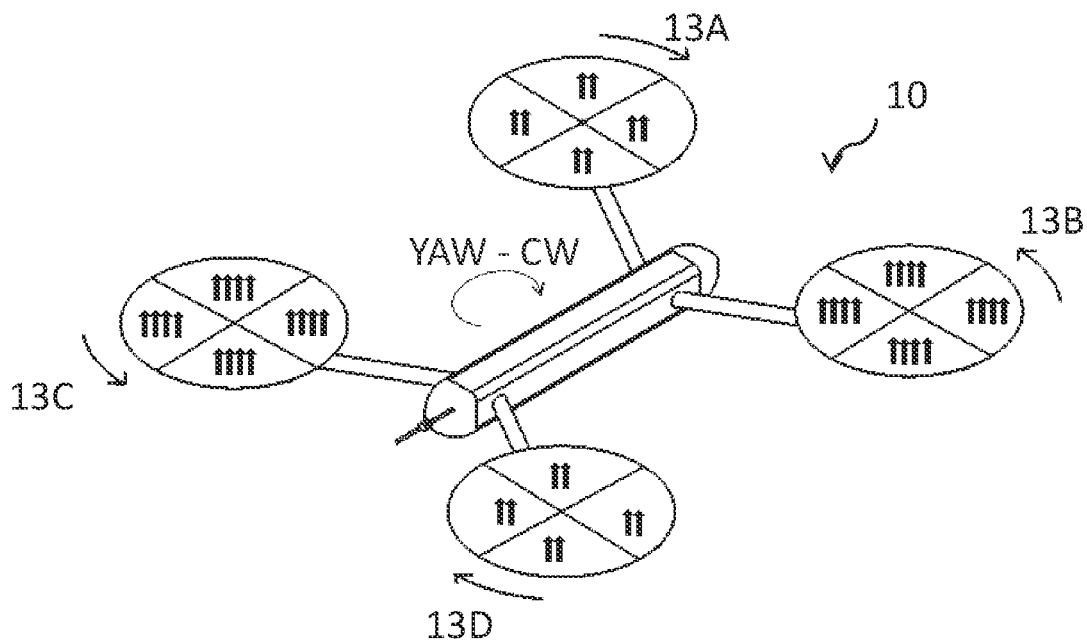
FIG. 20B is a schematic perspective view of the FIG. 2A quadcopter showing use of collective control for clockwise yaw.

FIG. 18 to FIG. 20 show use of collective rotor blade pitch only for right roll, pitch down and clockwise yaw, respectively. FIG. 18A, FIG. 19A and FIG. 20A show an input control to the collective rotor blade pitch. FIG. 18A, FIG. 19A and FIG. 20A show two rotor blade pitches: high and low. FIG. 18B, FIG. 19B and FIG. 20B show the effect of the input control on the lift forces on the rotor systems 13A, 13B, 13C and 13D.

FIG. 18B shows the rotor system 13A and the rotor system 13C provide the same lift, the rotor system 13B and the rotor system 13D provide the same lift, and the former provide greater lift than the latter for right roll. FIG. 19B shows the rotor system 13A and the rotor system 13B provide the same lift, the rotor system 13C and the rotor system 13D provide the same lift, and the latter provide greater lift than the former for pitch down. FIG. 20B shows the rotor system 13A and the rotor system 13D provide the same lift, the rotor system 13B and the rotor system 13C provide the same lift, and the latter provide a greater lift than the former for clockwise yaw.

Figure 21A:
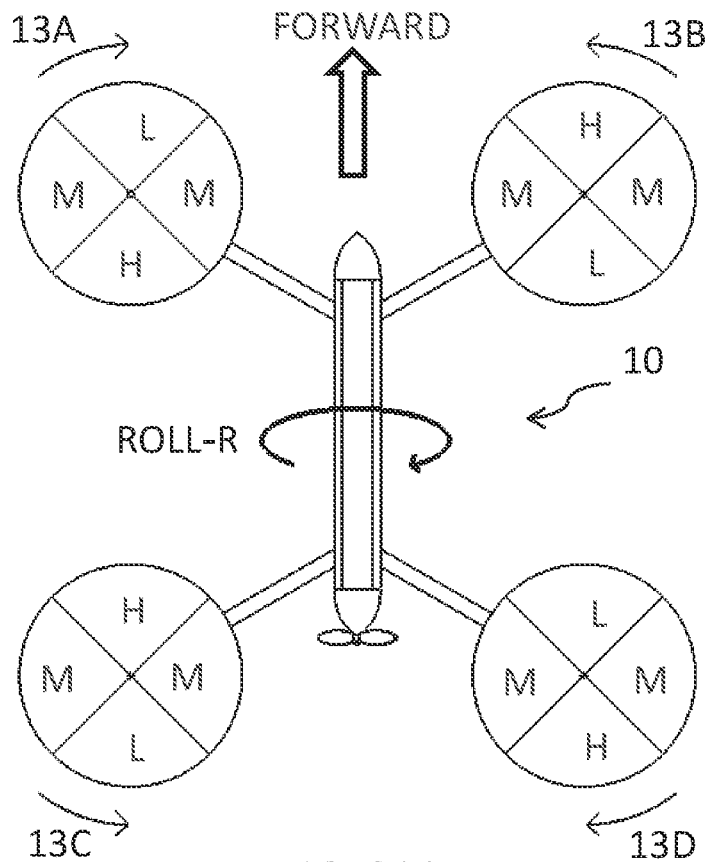
FIG. 21A is a schematic top view of the FIG. 2A quadcopter showing use of cyclic control for right roll.
Figure 21B:
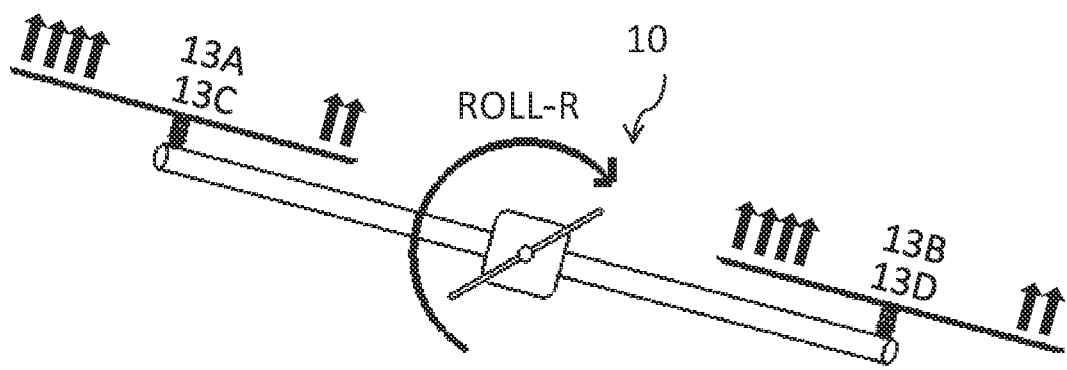
FIG. 21B is a schematic trailing end view of the FIG. 2A quadcopter showing use of cyclic control for right roll.
Figure 22A:
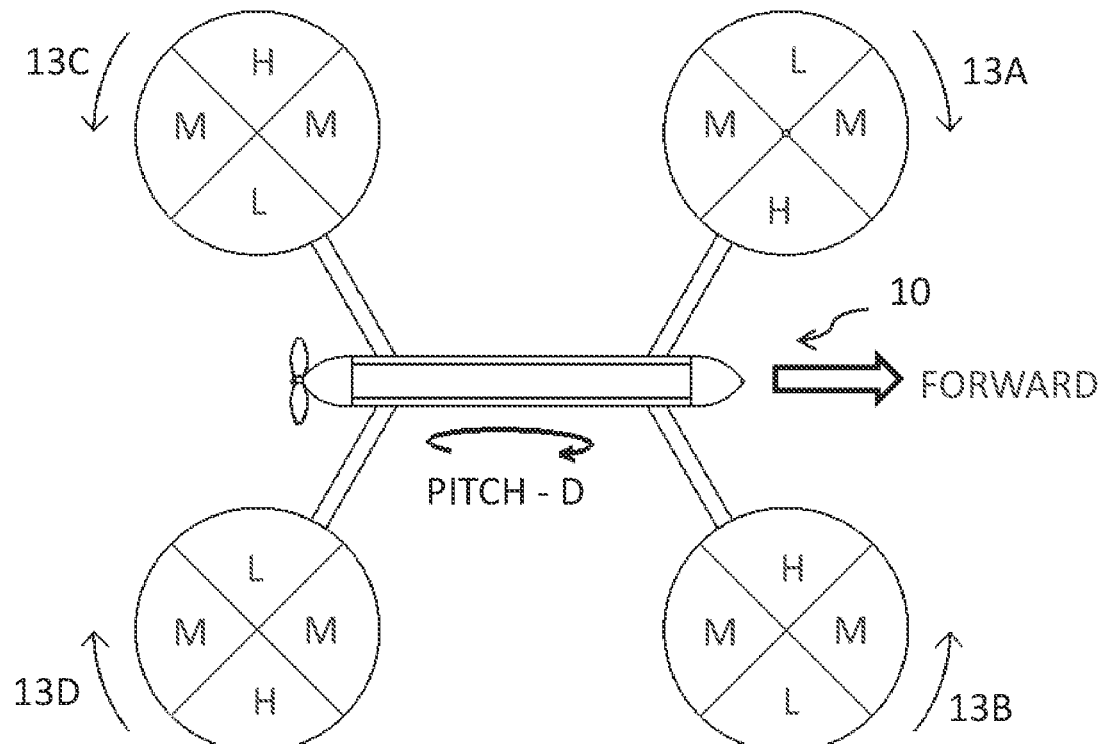
FIG. 22A is a schematic top view of the FIG. 2A quadcopter showing use of cyclic control for pitch down.
Figure 22B:
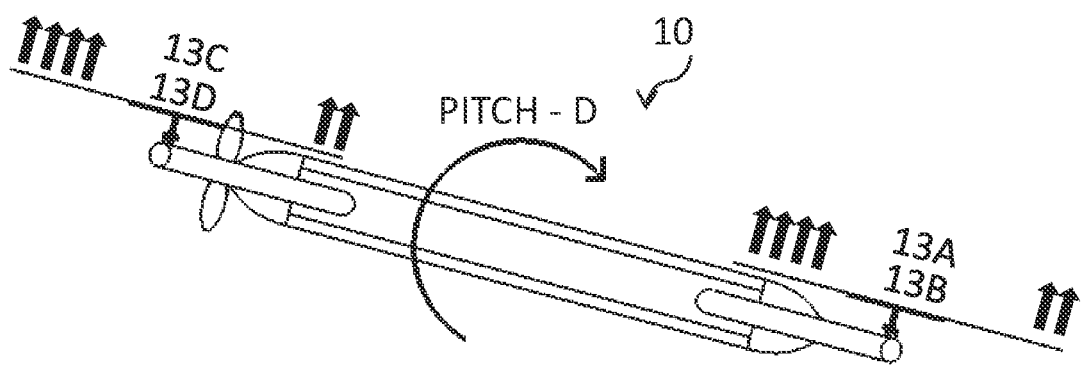
FIG. 22B is a schematic right elevation view of the FIG. 2A quadcopter showing use of cyclic control for pitch down.
Figure 23A:
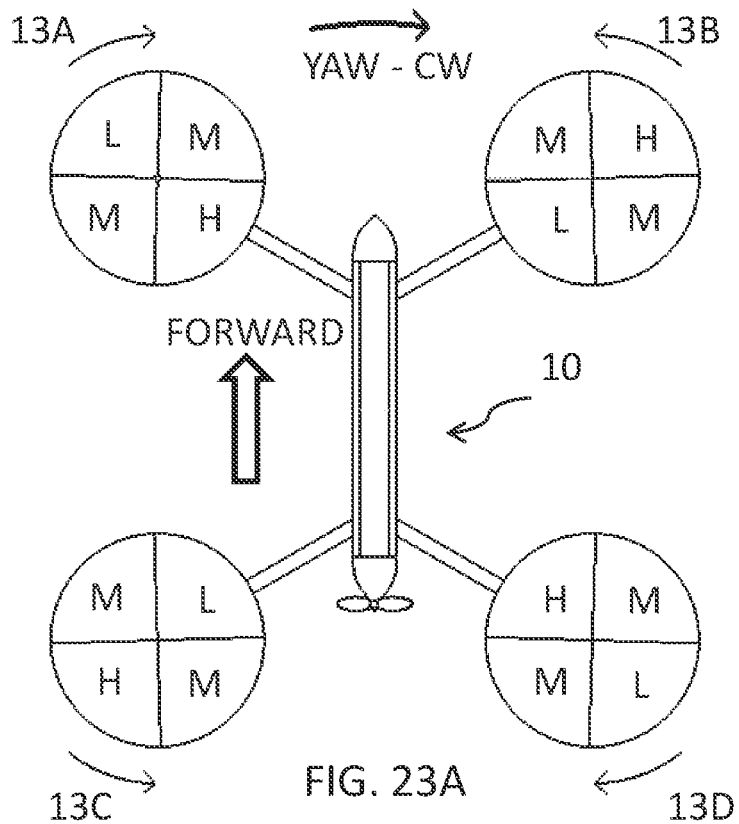
FIG. 23A is a schematic top view of the FIG. 2A quadcopter showing use of cyclic control for clockwise yaw.
Figure 23B:
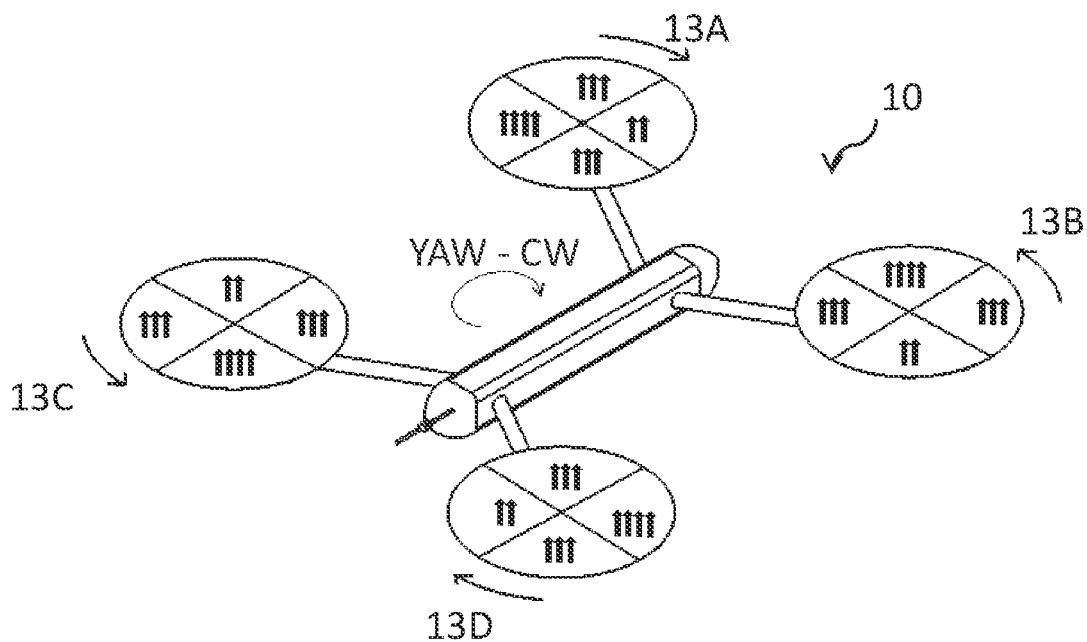
FIG. 23B is a schematic perspective view of the FIG. 2A quadcopter showing use of cyclic control for clockwise yaw.

FIG. 21 to FIG. 23 show use of cyclic rotor blade pitch only for right roll, pitch down, and clockwise yaw, respectively. FIG. 21A, FIG. 22A and FIG. 23A show an input control to the cyclic rotor blade pitch. FIG. 21A, FIG. 22A and FIG. 23A show three rotor blade pitches: high, medium and low. FIG. 21B, FIG. 22B and FIG. 23B show the effect of the input control on the lift forces on the rotor systems taking into account the phase lag from the input control.

FIG. 21B shows the rotor systems 13A, 13B, 13C and 13D each provide more lift on their left side than their right side for right roll. FIG. 22B shows the rotor systems 13A, 13B, 13C and 13D each provide more lift on their rear side than their front side for pitch down. FIG. 23B shows the rotor systems 13A, 13B, 13C and 13D provide required lift for clockwise yaw.

Figure 24A:
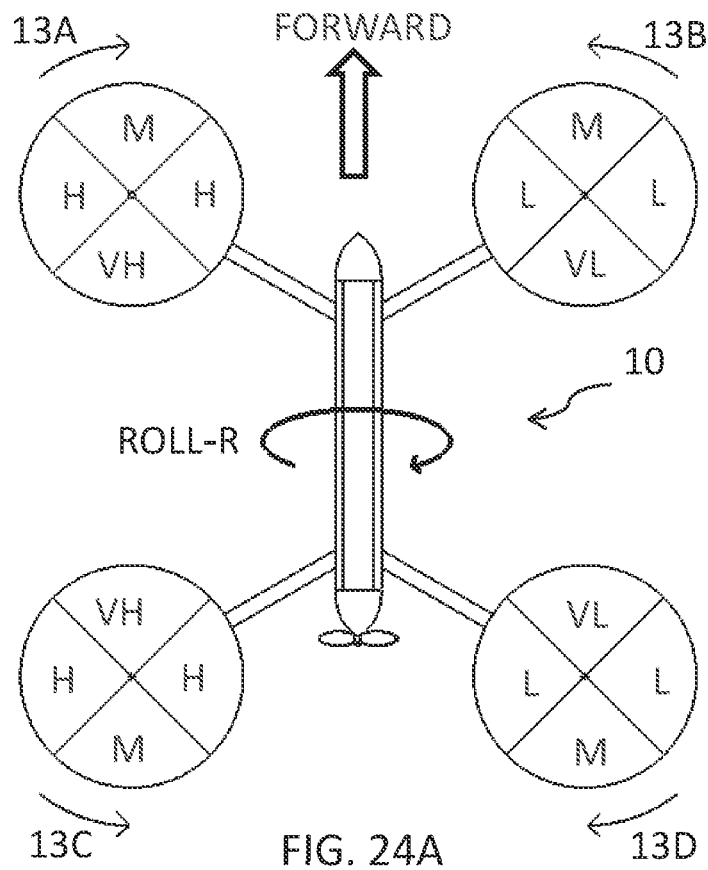
FIG. 24A is a schematic top view of the FIG. 2A quadcopter showing combined use of collective control and cyclic control for right roll.
Figure 24B:
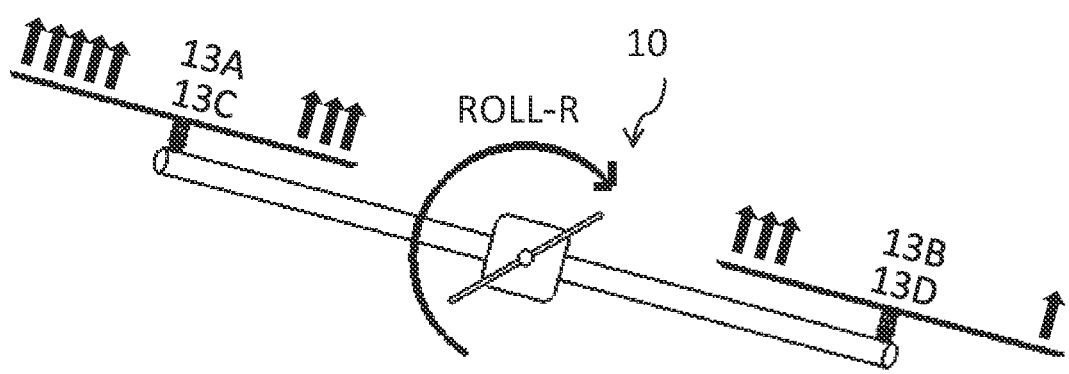
FIG. 24B is a schematic trailing end view of the FIG. 2A quadcopter showing combined use of collective control and cyclic control for right roll.

FIG. 24 to FIG. 26 show combined use of collective rotor blade pitch and cyclic rotor blade pitch for right roll, pitch down, and clockwise yaw, respectively. FIG. 24A, FIG. 25A and FIG. 26A show an input control to the collective rotor blade pitch and the cyclic rotor blade pitch. FIG. 24A, FIG. 25A and FIG. 26A show five rotor blade pitches from high to low. FIG. 24B, FIG. 25B and FIG. 26B show the effect of the input control on the lift forces on the rotor systems 13A, 13B, 13C and 13D taking into account the phase lag from the input control.

FIG. 24B shows lift forces combined from FIG. 18B and FIG. 21B for right roll. FIG. 25B shows lift forces combined from FIG. 19B and FIG. 22B for pitch down. FIG. 26B shows lift forces combined from FIG. 20B and FIG. 23B for clockwise yaw.

Figure 27:
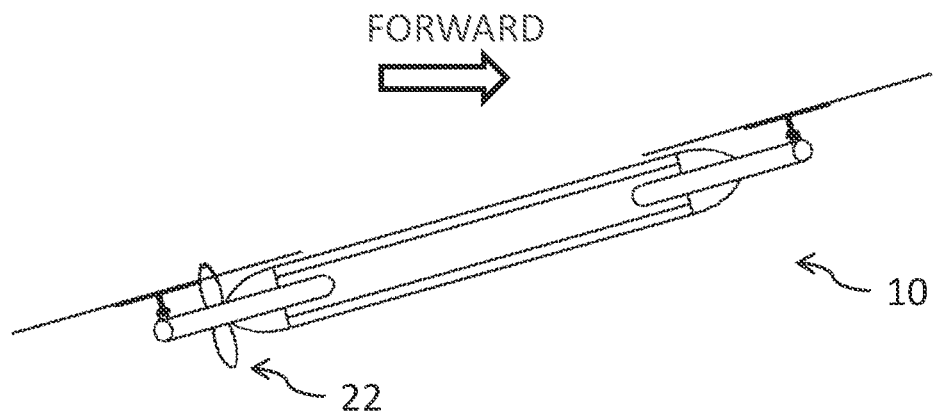
FIG. 27 is a pictorial view showing the FIG. 2A quadcopter gyro-cruising in forward flight.

FIG. 27 shows a quadcopter 10 in forward flight by virtue of preferably gyro-cruising only. Such gyro-cruising requires simultaneously pitching the quadcopter 10 upwardly and driving the forward propulsion unit 22 thereby autorotating the rotor systems 13A-13D. The electric rotor motors 17 can optionally partially drive the masts 14 for assisting gyro-cruising. The rotorcraft's upward pitching for gyro-cruising forward is in contradistinction to a conventional helicopter's downward pitching for forward flight.

Figure 28:
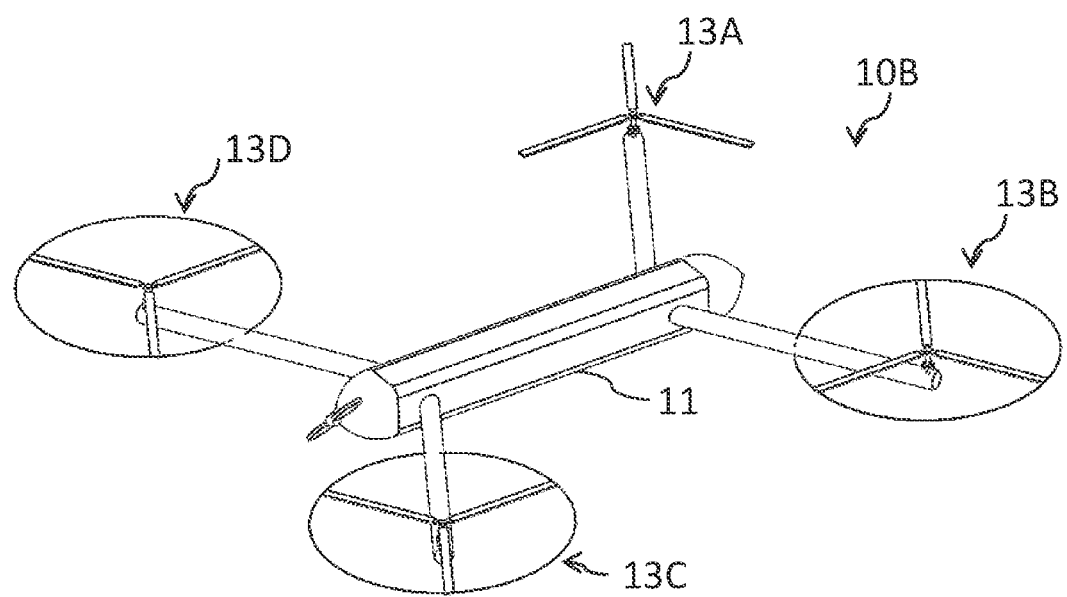
FIG. 28 is a pictorial view of the FIG. 2A quadcopter flying on three rotor systems.

FIG. 28 shows the quadcopter 10B is capable of flying in the case of a catastrophic malfunction of a rotor system, in this case, the rotor system 13A. Loss of the rotor system 13A can be compensated for by means of suitable cyclic control of the remaining rotor systems 13B-13D.

Section 3: Technical Benefits of Present Invention Rotorcraft

Rotorcraft of the present invention have considerable technical benefits compared to the aforementioned conventional rotorcraft, namely, a helicopter, a gyrodyne, the U.S. '853 gyrodyne, and the EP '332 rotorcraft as summarized in the following table indicating a two level grading system: Good and Medium

|  | Present invention | Helicopter | Gyrodyne | US '853 gyrodyne | EP '332 rotorcraft |
| --- | --- | --- | --- | --- | --- |
| Flight Redundancy | Good | None | None | None | None |
| Rotor system Redundancy | Good | None | None | None | Good |
| Cruising Energy Consumption | Good | Medium | Good | Good | Medium |
| Maximum flight speed Vne | Good | Medium | Medium | Good | Medium |
| Operation Weather Limitation | Good | Medium | Medium | Medium | Good |
| Safe Emergency Landing | Good | Good | Good | Medium | Medium |

Flight Redundancy

The present invention has flight redundancy capability for cruising flight at a non-descending altitude, and also during climbing and descending. In case of power failure of one or more rotor motors, the FCS can control the rotorcraft of the present invention flight by virtue of the rotorcraft's cyclic control. Conversely, in case of a power failure of a forward propulsion unit, a FCS can drive the electric rotor motors to fly a rotorcraft of the present invention.

None of the helicopter, the gyrodyne, the U.S. '853 gyrodyne, and the EP '332 rotorcraft has such flight redundancy capability. The helicopter and the EP '332 rotorcraft do not have a forward propulsion unit for providing forward thrust. The gyrodyne requires its one or more forward propulsion propellers for cruising flight, climbing, descending and hovering. The U.S. '853 gyrodyne requires its protors for steering during cruising flight, climbing, descending and hovering.

Rotor System Redundancy

The rotorcraft of the present invention are controllable on the condition that its cyclic control can operate at least one rotor system. Accordingly, in the case of a rotorcraft with at least three rotor systems having at least two rotor systems with cyclic capabilities, even if one of the rotor systems with cyclic capabilities becomes inoperative, the rotorcraft can still be controlled and complete its flight to safe landing.

The EP '332 rotorcraft also has rotor system redundancy but the gyrodyne and U.S. '853 gyrodyne do not have adjustable cyclic rotor blade pitch and therefore do not have rotor system redundancy Cruising Energy Consumption Maximum energy efficiency is achieved at a lowest platform angle of attack relative to air flow as possible by virtue of reducing total drag to a minimum. The present invention employs a forward propulsion unit for cruising and therefore can cruise at a low platform angle of attack relative to air flow.

In comparison to conventional rotorcraft, the present invention has comparable energy consumption to a gyrodyne and the U.S. '853 gyrodyne during cruising. The former three have improved energy consumption relative to a helicopter and the EP '332 rotorcraft because the latter two do not have a forward propulsion unit and therefore require a higher platform angle of attack relative to air flow.

Maximum Flight Speed Vne

Maximum flight speed Vne is limited by stalling of a retreating rotor blade. Stalling occurs at a rotor blade's high angle of attack relative to air flow. The present invention gains air speed by increasing a forward propulsion unit's thrust rather than by forward cyclic control thereby avoiding a high angle of attack of a retreating rotor blade.

In comparison to conventional rotorcraft, the present invention has a maximum flight speed Vne comparable a gyrodyne and the U.S. '853 gyrodyne. The former three have a higher maximum flight speed than a helicopter and the EP '332 rotorcraft because the latter two do not include a forward propulsion unit.

Operational Weather Limitation

The present invention's maneuverability depends on how many of its rotor systems include a cyclic mechanism for enabling individual or simultaneous adjustment of collective rotor blade pitch and cyclic rotor blade pitch. The greater the number of swashplate mechanisms the greater the maneuverability. The present invention is equally steerable when hovering and cruising at a non-descending altitude, and also when climbing and descending. The present invention's steering can be further improved by provision of vectored thrust means.

Present invention having multiple swashplate mechanisms: Grade Good

In comparison to conventional rotorcraft, the present invention has comparable maneuverability to the EP '332 rotorcraft. The former two are more maneuverable than a helicopter and a gyrodyne because the latter two have a single rotor system and are restricted to using their cyclic rotor blade pitch for rotorcraft roll and rotorcraft pitch. The former two are more maneuverable than the U.S. '853 gyrodyne because the latter omits a cyclic control.

Safe Emergency Landing

In case of power failures of both all electric rotor motors and the forward propulsion unit, full steering capability is maintained by virtue of at least one rotor system being operable by a rotorcraft's cyclic control. Safe emergency landings require both steering and autorotation. The present invention includes at least three rotor systems, at least one swashplate mechanism or alternative mechanism for controlling cyclic pitch of at least one rotor system, a forward propulsion unit, and preferably at least one freewheel arrangement.

In case the present invention does not include at least one freewheel arrangement, the present invention maintains steering and autorotation similar to the EP '332 rotorcraft and descends at a similar steep descent rate. The U.S. '853 gyrodyne has a limited steering capability because it does not include swashplate mechanisms and also descends at a steep descent rate.

In case the present invention includes at least one freewheel arrangement, the present invention is capable of a safe emergency landing at a shallow descent rate similar to a helicopter and a gyrodyne.

While the invention has been described with respect to a limited number of embodiments, it will be appreciated that many variations, modifications, and other applications of the invention can be made within the scope of the appended claims.

The invention claimed is:

1. A rotorcraft comprising:
   (a) a fuselage;
   (b) at least three rotor system arms mounted on said fuselage, each said rotor system arm having a rotor system displaced from said fuselage, each said rotor system including:
      i) a mast having at least two rotor blades, and
      ii) an electric rotor motor coupled to said mast for driving said mast whereupon said at least two rotor blades act as a rotating rotor disc,
      each said rotor system of said at least three rotor systems having an individually controllable collective rotor blade pitch,
      at least one rotor system of said at least three rotor systems having a controllable cyclic rotor blade pitch;
   (c) a forward propulsion unit mounted on said fuselage for providing forward propulsion to the rotorcraft; and
   (d) a flight control system for controlling said at least three electric rotor motors, said collective rotor blade pitch of each said rotor system of said at least three rotor systems, said cyclic rotor blade pitch of said at least one rotor system of said at least three rotor systems and said forward propulsion unit in response to an input control indicating a desired maneuver to operate the rotorcraft for takeoff, gyro-cruising for straight and level forward flight, and landing,
   wherein,
   after takeoff, the flight control system being configured to simultaneously upwardly pitch the rotorcraft and drive said forward propulsion unit thereby at least partially autorotating said at least three rotor systems for said gyro-cruising for straight and level forward flight,
   each said rotor system of said at least three rotor systems continuously rotating in the same direction for takeoff, gyro-cruising for straight and leveled flight, and landing.

2. The rotorcraft according to claim 1 wherein said each rotor system of said at least three rotor systems having an individually controllable cyclic rotor blade pitch.

3. The rotorcraft according to claim 1 wherein at least one rotor system of said at least three rotor systems includes a freewheel arrangement.

4. The rotorcraft according to claim 1 wherein said rotorcraft is configured for said gyro-cruising for straight and level forward flight when said at least three rotor systems are powered upto 25% of their maximum power.

5. The rotorcraft according to claim 4 wherein said rotorcraft is configured for said gyro-cruising for straight and level forward flight when said at least three rotor systems are not powered.

6. The rotorcraft according to claim 1 wherein said rotor system arms are configured as aerodynamic wings for providing lift.

7. A flight control system configured to control the at least three electric rotor motors, the collective rotor blade pitch of each rotor system of said at least three rotor systems, the cyclic rotor blade pitch of the at least one rotor system of the at least three rotor systems and the forward propulsion unit, in a rotorcraft according to claim 1, in response to an input control indicating a desired maneuver to operate the rotorcraft for takeoff, gyro-cruising for straight and level forward flight, and landing, wherein, after takeoff, the flight control system being configured to simultaneously pitch the rotorcraft upwardly and drive said forward propulsion unit thereby at least partially autorotating the at least three rotor systems for said gyro-cruising for straight and level forward flight.

8. A computer readable storage medium comprising instructions which, when executed by a flight control system in a rotorcraft according to claim 1, cause the flight control system to carry out the controlling of the at least three electric rotor motors, the collective rotor blade pitch of each rotor system of the at least three rotor systems, the cyclic rotor blade pitch of the at least one rotor system of the at least three rotor systems and the forward propulsion unit, in response to an input control indicating a desired maneuver to operate the rotorcraft for takeoff, gyro-cruising for straight and level forward flight, and landing, wherein the controlling of the rotorcraft includes simultaneously pitching the rotorcraft upwardly and driving the forward propulsion unit, thereby at least partially autorotating the at least three rotor systems for said gyro-cruising for straight and level forward flight.

9. A method for operating a rotorcraft comprising the steps of:

a) providing a rotorcraft having:

a fuselage, at least three rotor system arms mounted on the fuselage, each rotor system arm having a rotor system displaced from the fuselage, each rotor system including a mast having at least two rotor blades and an electric rotor motor coupled to the mast for driving the mast whereupon said at least two rotor blades act as a rotating rotor disc, each rotor system of the at least three rotor systems having an individually controllable collective rotor blade pitch, at least one rotor system of the at least three rotor systems having a controllable cyclic rotor blade pitch, a forward propulsion unit mounted on the fuselage for providing forward propulsion to the rotorcraft; and b) controlling the at least three electric rotor motors, the collective rotor blade pitch of each rotor system of the at, least three rotor systems, the cyclic rotor blade pitch of the at least one rotor system of the at least three rotor systems, and the forward propulsion unit in response to an input control indicating a desired maneuver to operate the rotorcraft for takeoff, gyro-cruising for straight and level forward flight, and landing, wherein, after takeoff the controlling of the rotorcraft includes simultaneously pitching the rotorcraft upwardly and driving said forward propulsion unit, thereby at least partially autorotating the at least three rotor systems for said gyro-cruising for straight and level forward flight, each said rotor system of said at least three rotor systems continuously rotating in the same direction for takeoff, gyro-cruising for straight and leveled flight, and landing.

\* \* \* \* \*